US007819637B2

(12) United States Patent
Oda et al.

(10) Patent No.: US 7,819,637 B2
(45) Date of Patent: Oct. 26, 2010

(54) SOLENOID VALVE, FLOW-METERING VALVE, HIGH-PRESSURE FUEL PUMP AND FUEL INJECTION PUMP

(75) Inventors: Kaoru Oda, Toyokawa (JP); Hiroshi Inoue, Anjo (JP); Nobuo Ota, Takahama (JP); Yoshitsugu Inaguma, Chita-gun (JP); Yutaka Niwa, Nagoya (JP)

(73) Assignee: Denso Corporation, Kariya (JP)

( * ) Notice: Subject to any disclaimer, the term of this patent is extended or adjusted under 35 U.S.C. 154(b) by 511 days.

(21) Appl. No.: 11/304,728

(22) Filed: Dec. 16, 2005

(65) Prior Publication Data

US 2006/0222518 A1 Oct. 5, 2006

(30) Foreign Application Priority Data

Dec. 17, 2004 (JP) ............................ 2004-365509
Apr. 26, 2005 (JP) ............................ 2005-127781

(51) Int. Cl.
*F04B 49/00* (2006.01)
*F16K 31/02* (2006.01)

(52) U.S. Cl. .............. 417/298; 251/129.07; 251/129.08

(58) Field of Classification Search ................. 417/298, 417/505, 457; 123/506, 457, 511, 495, 456, 123/446; 251/282, 129.15, 129.14, 129.07, 251/129.01
See application file for complete search history.

(56) References Cited

U.S. PATENT DOCUMENTS 3,709,639 A * 1/1973 Suda et al. .................. 417/493
3,937,242 A * 2/1976 Eckert ........................ 137/102
4,241,714 A * 12/1980 Knape et al. ................ 123/499
4,249,868 A * 2/1981 Kotyk ........................ 417/511
4,371,317 A * 2/1983 Heibel ........................ 417/298
4,610,233 A * 9/1986 Kushida et al. ............. 123/458
4,777,921 A * 10/1988 Miyaki et al. ............... 123/456
4,793,314 A * 12/1988 Yoshinaga et al. .......... 123/506
5,285,969 A * 2/1994 Greiner et al. .............. 239/463
5,606,953 A * 3/1997 Drummer et al. ........... 123/506
5,639,066 A * 6/1997 Lambert et al. ............. 251/282
5,641,148 A * 6/1997 Pena et al. ............. 251/129.07

(Continued)

FOREIGN PATENT DOCUMENTS

JP 60-162238 10/1985

(Continued)

OTHER PUBLICATIONS

EPO Search Report dated Apr. 28, 2006.

(Continued)

*Primary Examiner*—Charles G Freay
*Assistant Examiner*—Alexander B Comley
(74) *Attorney, Agent, or Firm*—Nixon & Vanderhye PC

(57) ABSTRACT

A flow-metering valve for metering a flow of liquid has a valve member, a stopper and an electromagnetic driving member. The valve member is reciprocally displaceably arranged between a first position and a second position in the liquid chamber. The stopper is arranged at the second position in the liquid chamber. The electromagnetic driving member generates a magnetic attractive force between the valve member and the stopper to hold the valve member at the second position when the electromagnetic driving member is energized.

7 Claims, 15 Drawing Sheets

U.S. PATENT DOCUMENTS

| | | | | |
|---|---|---|---|---|
| 5,927,614 | A * | 7/1999 | Touvelle et al. | 239/585.1 |
| 5,983,863 | A * | 11/1999 | Cavanagh et al. | 123/447 |
| 6,116,870 | A * | 9/2000 | Kraemer | 417/490 |
| 6,311,674 | B1 * | 11/2001 | Igashira et al. | 123/458 |
| 6,345,608 | B1 * | 2/2002 | Rembold et al. | 123/506 |
| 6,446,606 | B1 * | 9/2002 | Krimmer et al. | 123/458 |
| 6,447,273 | B1 * | 9/2002 | Nishimura et al. | 417/505 |
| 6,631,706 | B1 * | 10/2003 | Yamada et al. | 123/495 |
| 6,640,788 | B2 * | 11/2003 | Inoue et al. | 123/506 |
| 6,669,166 | B2 * | 12/2003 | Enomoto et al. | 251/129.15 |
| 6,789,778 | B1 * | 9/2004 | Spahn et al. | 251/129.07 |
| 6,807,896 | B2 * | 10/2004 | Inoue | 92/165 R |
| 6,807,943 | B2 * | 10/2004 | VanWeelden et al. | 123/458 |
| 6,824,120 | B2 * | 11/2004 | Furuta et al. | 251/355 |
| 6,866,242 | B2 * | 3/2005 | Hirota | 251/129.07 |
| 6,918,409 | B1 * | 7/2005 | Parker | 137/614.11 |
| 6,959,907 | B2 * | 11/2005 | Hironaka | 251/50 |
| 2001/0031207 | A1 * | 10/2001 | Maeda et al. | 417/298 |
| 2001/0048091 | A1 * | 12/2001 | Enomoto et al. | 251/129.15 |
| 2002/0117154 | A1 * | 8/2002 | Inoue et al. | 123/506 |
| 2003/0089872 | A1 * | 5/2003 | Furuta et al. | 251/129.14 |
| 2004/0046140 | A1 * | 3/2004 | Hirota | 251/129.08 |
| 2004/0055580 | A1 * | 3/2004 | Yamada et al. | 123/495 |
| 2004/0261771 | A1 * | 12/2004 | Ichinose et al. | 123/514 |
| 2006/0222518 | A1 * | 10/2006 | Oda et al. | 417/298 |

FOREIGN PATENT DOCUMENTS

| | | |
|---|---|---|
| JP | 2-40170 | 3/1990 |
| JP | 2-146283 | 12/1990 |
| JP | 09-112731 | 5/1997 |
| JP | 2002-48033 | 2/2002 |

OTHER PUBLICATIONS

Examination Report dated Dec. 14, 2007 in CN Application No. 200510022916.8 with English translation.

EPO Examination Report dated Dec. 13, 2006.

Chinese Office Action dated Jun. 8, 2007 in Chinese Application No. 200510022916.8, together with an English translation.

Japanese Office Action dated Oct. 13, 2009, issued in counterpart Japanese Application No. 2005-127781, with English translation.

Japanese Office Action dated Oct. 19, 2009, issued in counterpart Japanese Application No. 2004-365509, with English translation.

* cited by examiner

SOLENOID VALVE, FLOW-METERING VALVE, HIGH-PRESSURE FUEL PUMP AND FUEL INJECTION PUMP

CROSS REFERENCE TO RELATED APPLICATION

This application is based on and incorporates herein by reference Japanese Patent Application No. 2004-365509 filed on Dec. 17, 2004 and No. 2005-127781 filed on Apr. 26, 2005.

BACKGROUND OF THE INVENTION

1. Field of the Invention

The present invention relates to a solenoid valve, a flow-metering valve, a high-pressure fuel pump and a fuel injection pump.

2. Description of Related Art

A solenoid valve used in a fuel injection pump to serve as a flow-metering valve for metering a flow of liquid that is supplied through a liquid inlet port and outflows through a liquid outlet port is disclosed in, for example, Japanese Examined Patent Publication No. S50-6043 (corresponding to U.S. Pat. No. 3,709,639), Japanese Unexamined Patent Publication No. H10-141177 (corresponding to U.S. Pat. No. 6,116,870) and Japanese Unexamined Patent Publication No. 2002-48033. Each fuel injection pump disclosed in the above publications includes the flow-metering valve disposed at a fuel inlet port side of a fuel pump chamber. The flow-metering valve is opened and closed to intermittently enable communication between the fuel pump chamber and the fuel inlet port. Then, an electromagnetic driving member is energized to control closing timing for closing a valve of the flow-metering valve when fuel is compressed, thereby adjusting a fuel pump quantity.

In the flow-metering valve disclosed in the above-described publications, a mobile member is displaced by a magnetic attractive force generated when the electromagnetic driving member is energized, so that the flow-metering valve is closed or is kept open. In the above-described structure, where the mobile member spaced away from a magnetic force generation source is displaced by the magnetic attractive force, a large magnetic attractive force is necessary to attract the mobile member. As a result, there may be disadvantages that the electromagnetic driving member needs to be large and that an energy consumption is increased to generate the magnetic attractive force. Also, in the above-described structure where the mobile member is attracted from a position spaced away from the mobile member, the magnetic attractive force needs to be enhanced so that a response speed to the energization of the electromagnetic driving member is enhanced to quickly displace the mobile member by the magnetic attractive force. The magnetic attractive force also needs to be enhanced so that a clearance may be increased in order to increase an area of a passage when the flow-metering valve is open. As a result, there may be disadvantages that the electromagnetic driving member needs to be large and that energy consumption is increased to generate the magnetic attractive force.

Also, a normally-closed-type solenoid valve, which is opened by a differential pressure between an inlet port side and an outlet port side, is disclosed, for example, in Japanese Unexamined Patent Publication No. 2002-521616 corresponding to U.S. Pat. No. 6,345,608. According to a control valve (a solenoid valve) shown in FIGS. 3 and 4 in Japanese Unexamined Patent Publication No. 2002-521616, a valve member is biased by a spring 68 (a first bias member) in a valve closing direction for closing the control valve. Also, a mobile member (a mobile core) is biased by a spring 64 to be spaced away from the valve member. When an intake stroke in a pump chamber is performed, a pressure in the pump chamber is decreased to become lower than a pressure in a fuel connection part. Thus, the valve member is detached from a valve seat by the differential pressure therebetween against a bias force of the spring 68.

A control unit (driving circuit) starts energizing an electromagnet immediately before the intake stroke is finished. Then, the mobile core is attracted to the electromagnet against a bias force of the spring 64. When the mobile core is attracted toward the electromagnet, a plunger (a needle) is displaced in a valve opening direction for opening the control valve so that the valve member is limited from being seated.

When the intake stroke is finished and a pumping stroke is started, a pressure in the pump chamber is increased. The control valve is prohibited from being closed even when the pressure in the pump chamber is increased, because the valve member is prohibited from being seated as discussed before. Thus, a part of fuel returns to the fuel connection part from the pump chamber.

When an engine is running at a high speed, the solenoid valve needs to be highly responsive. Specifically, when the electromagnet is energized, the needle needs to be immediately displaced to the valve opening direction.

According to the solenoid valve described in FIGS. 3 and 4 of Japanese Unexamined Patent Publication No. 2002-521616, the mobile core is biased by the spring 64 to be spaced away from the valve member. Thus, when the electromagnet is not energized, the mobile core is disposed at the furthest position from the valve member. In other words, there is a large air gap between the mobile core and a stopper disc 78*u*. Because the mobile core is biased by the spring 64 to be spaced away from the valve member, and also because of the large air gap, a large current needs to be applied to the electromagnet by a current drive to immediately displace the needle. Thus, the solenoid valve described in FIGS. 3 and 4 of Japanese Unexamined Patent Publication No. 2002-521616 has a disadvantage that a cost of the drive circuit for driving the electromagnet is increased if a substantial response speed needs to be achieved.

SUMMARY OF THE INVENTION

The present invention addresses the above disadvantages. Thus, it is an objective of the present invention to provide a flow-metering valve having a minimized electromagnetic driving member so that the power consumption is reduced.

It is also an objective of the present invention to provide a solenoid valve that achieves a substantial response speed without increasing a cost of a driving circuit thereof, and to provide a high-pressure pump having the solenoid valve.

To achieve the objective of the present invention, there is provided a flow-metering valve for metering a flow of liquid having a liquid inlet port, a liquid outlet port, a liquid chamber, a valve member, a stopper and an electromagnetic driving member. The liquid is supplied to the flow-metering valve through the liquid inlet port. The liquid outflows from the flow-metering valve through the liquid outlet port. The liquid chamber is formed between the liquid inlet port and the liquid outlet port. The valve member is arranged in the liquid chamber so that the valve member is reciprocally displaceable between a first position and a second position in the liquid chamber according to a differential pressure between a first position side of the valve member and a second position side of the valve member. Also, the valve member enables communication between the liquid inlet port and the liquid outlet port when the valve member is spaced away from the first position. The stopper is arranged at the second position in the liquid chamber so that the stopper contacts the valve member when the valve member is located at the second position, which serves as a valve opening position. The electromagnetic driving member generates a magnetic attractive force between the valve member and the stopper to hold the valve member at the second position when the electromagnetic driving member is energized.

To achieve the objective of the present invention, there is also provided a fuel injection pump, which includes the above described flow-metering valve and a plunger. The plunger is reciprocably displaceable to compress fuel, which is supplied into the liquid chamber through the liquid inlet port, and pumps the fuel through the liquid outlet port so that the liquid inlet port, the liquid outlet port and the valve member are arranged on a first side of the stopper and the plunger is arranged on a second side of the stopper, which is opposite from the first side of the stopper.

To achieve the objective of the present invention, there is also provided a solenoid valve, which includes a liquid inlet port, a liquid outlet port, a liquid passage, a valve member, a first bias member, a needle, an electromagnetic driving member and a second bias member. Liquid is supplied to the solenoid valve through the liquid inlet port. The liquid outflows from the solenoid valve through the liquid outlet port. The liquid passage is arranged between the liquid inlet port and the liquid outlet port. The valve member opens and closes the liquid passage. The first bias member provides a bias force to bias the valve member in a first direction such that the valve member closes the liquid passage. The needle is displaceable independently of the valve member so that the needle contacts the valve member to limit displacement of the valve member in the first direction. The electromagnetic driving member includes a mobile core, a stationary core and a coil. The mobile core is displaceable along with the needle. The stationary core is arranged to face with the mobile core. The coil generates a magnetic attractive force to attract the mobile core to the stationary core such that the needle is displaced in a second direction toward the valve member. The second bias member provides a bias force to bias the needle in the second direction so that the bias force of the first bias member is greater than the bias force of the second bias member.

To achieve the objective of the present invention, there is also provided a solenoid valve, which includes a liquid inlet port, a liquid outlet port, a liquid passage, a valve member, a bias member and an electromagnetic driving member. Liquid is supplied to the solenoid valve through the liquid inlet port. The liquid outflows from the solenoid valve through the liquid outlet port. The liquid passage is arranged between the liquid inlet port and the liquid outlet port. The valve member opens and closes the liquid passage. The bias member biases the valve member in a first direction such that the valve member closes the liquid passage. The electromagnetic driving member includes a mobile core, a stationary core and a coil. The mobile core is displaceable along with the valve member. The stationary core is arranged to face with the mobile core. The coil generates a magnetic attractive force in such a manner that the mobile core is attracted to the stationary core. Therefore, the coil generates the magnetic attractive force such that the valve member is displaced in a second direction so that the valve member opens the liquid passage.

To achieve the objective of the present invention, there is also provided a high-pressure fuel pump, which includes a pump housing, a plunger and the above-described solenoid valve. The pump housing includes a fuel inlet port and a pump chamber. The plunger is reciprocally displaceably received in the pump housing in such a manner that the plunger is reciprocally displaced such that the plunger compresses fuel, which is supplied to the pump chamber through the fuel inlet port. The liquid passage of the solenoid valve is a fuel passage arranged between the fuel inlet port and the pump chamber, and the solenoid valve opens and closes the fuel passage.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF HE INVENTION

First Embodiment

A first embodiment of the present invention will be described with reference to the accompanying drawings.

Figure 1A:
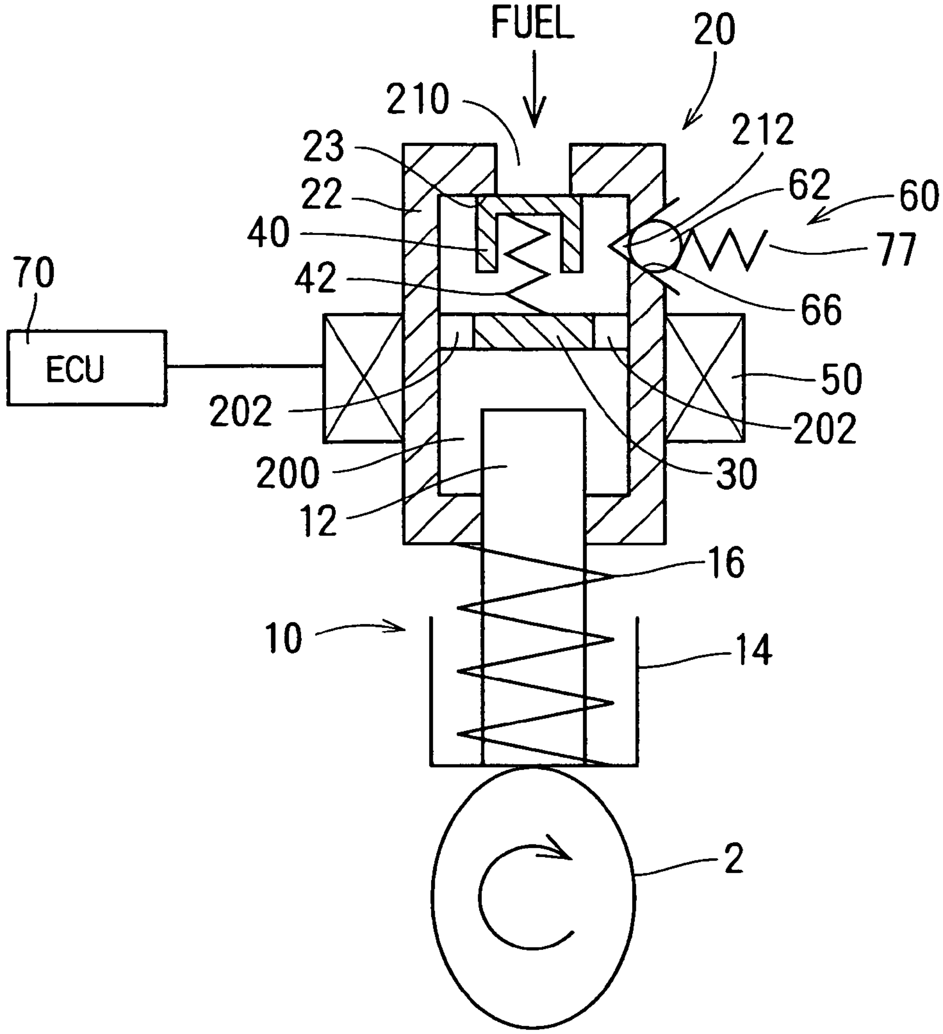
FIG. 1A is a sectional view of a fuel supply apparatus according to a first embodiment of the present invention.

FIG. 1 is a fuel injection pump according to the first embodiment of the present invention. The fuel injection pump 10 meters a pump quantity of high-pressure fuel by use of a metering valve 20, which serves as a flow-metering valve. Thus, the fuel injection pump is a high-pressure supply pump that supplies fuel to injectors of an internal combustion engine (e.g., a diesel engine or a gasoline engine.

A plunger 12 is supported by a housing 22 in such a manner that the plunger 12 is reciprocably displaceable, and the plunger 12 is displaceable along with a tappet 14. The tappet 14 is pressed toward a cam 2 by a bias force of a spring 16 in such a manner that an outer bottom surface of the tappet 14 is slidably movable relative to the cam 2 according to rotation of the cam 2.

The housing 22 serves as a housing of the metering valve 20, and also serves as a cylinder that forms a fuel pump chamber 200. The housing 22 includes the fuel pump chamber 200 serving as a liquid chamber, a fuel inlet port 210 as a liquid intake port, and a fuel outlet port 212 as a liquid outlet port.

Figure 1B:
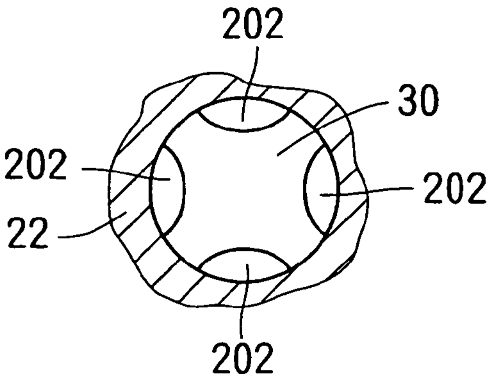
FIG. 1B is a view of a stopper of the fuel supply apparatus viewed from a plunger side of the stopper in FIG. 1A.

The metering valve 20 includes the housing 22, a stopper 30, a valve member 40, a spring 42 and a coil 50. The spring 42 serves as a bias member, and the coil 50 serves as an electromagnetic driving member. The stopper 30, the valve member 40 and the spring 42 are located in the fuel pump chamber 200. The stopper 30 is located on a fuel downstream side of the valve member 40. Also, the stopper 30 is made of, for instance, a magnetic material, a surface of which is coated with a non-magnetic material, and is formed into a plate shape. As shown in FIG. 1B, four notches are formed at an outer peripheral of the stopper 30. These notches form fuel passages (communication passages) 202, which are liquid passages located between a radially outer peripheral of the stopper 30 and an inner peripheral surface of the housing 22.

The valve member 40, the spring 42, the fuel inlet port 210 and the fuel outlet port 212 are located on one side of the stopper 30. The plunger 12 is located on the other side of the stopper 30, which is opposite from the one side of the stopper 30. The valve member 40 is, for instance, made of a magnetic material, a surface of which is coated with a non-magnetic material, and is formed into a cup shape. The valve member 40 is biased by the bias force of the spring 42 toward a valve seat 23 located on a fuel inlet port 210 side in the housing 22. When the valve member 40 is seated against the valve seat 23, the fuel inlet port 210 is closed. When the coil 50 is energized, a magnetic attractive force is generated between the valve member 40 and the stopper 30. An electronic control unit (ECU) 70 controls energization of the coil 50.

A fuel delivery valve 60 is located in the fuel outlet port 212. When the pressure in the fuel pump chamber 200 becomes more than or equal to a predetermined pressure, a ball 62 is detached from a valve seat 66 against a bias force of a spring 77. Then, the fuel in the fuel pump chamber 200 is pumped through the fuel outlet port 212.

Next, an operation of the fuel injection pump 10 will be described with reference to FIGS. 1, 2, and 3A to 3D.

Figures 3A, 3B, 3C, 3D:
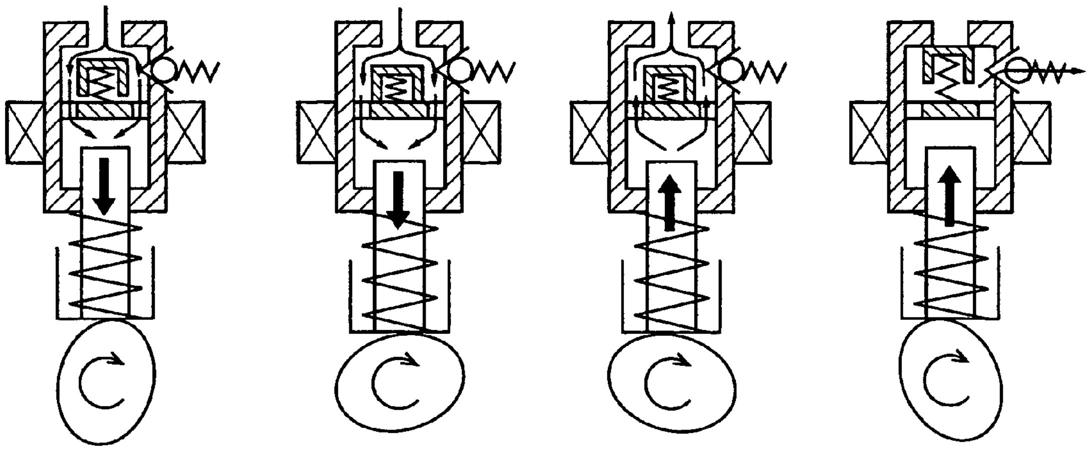
FIG. 3A is a view showing the fuel supply apparatus in a first part of an intake stroke in FIG. 2.
FIG. 3B is a view showing the fuel supply apparatus in a latter part of the intake stroke in FIG. 2.
FIG. 3C is a view showing the fuel supply apparatus in a return stroke in FIG. 2.
FIG. 3D is a view showing the fuel supply apparatus in a pumping stroke in FIG. 2.

The intake stroke will be described. As shown in FIGS. 3A and 3B, the plunger 12 goes down from a top dead center to a bottom dead center according to the rotation of the cam 2 so that the pressure in the fuel pump chamber 200 is decreased. Thereby, a differential pressure applied to the valve member 40 is changed. Here, the differential pressure is generated between the fuel inlet port 210 side, which is an upstream side of the valve member 40, and a fuel pump chamber 200 side, which is a downstream side thereof. When a sum of forces that displace the valve member 40 toward the valve seat 23 becomes smaller than a counter force that displaces the valve member 40 away from the valve seat 23, the valve member 40 is detached from the valve seat 23 and is held on the stopper 30. Here, the sum of the forces includes a force by a fuel pressure in the fuel pump chamber 200 and the bias force of the spring 42. The counter force is caused by the fuel pressure in the fuel inlet port 210 side. Therefore, the fuel is supplied to the fuel pump chamber 200 through the fuel inlet port 210. Even in a state where the valve member 40 is held on the stopper 30 as shown in FIG. 3B, the fuel is supplied to a plunger 12 side in the fuel pump chamber 200 through fuel passages 202 because the fuel passages 202 are located radially outward of a contact point between the valve member 40 and the stopper 30.

Based on a signal indicative of a rotational signal of the cam 2, the ECU 70 starts energizing the coil 50 at a time point (timing Ts in FIG. 2), at which the valve member 40 is held on and is in contact with the stopper 30 just before reaching of the plunger 12 to the bottom dead center. Because the stopper 30 contacts the valve member 40, the magnetic attractive force can be small to keep a valve opening state where the valve member 40 is held on the stopper 30.

A return stroke will be described. When the plunger 12 goes up toward the top dead center from the bottom dead center as shown in FIG. 3C, the fuel passages 202 enable that the fuel pressure in the valve member 40 side in the fuel pump chamber 200 is increased. Thus, the force, which is applied to the valve member 40 toward the valve seat 23, is increased. However, because the coil 50 is energized to generate the magnetic attractive force between the stopper 30 and the valve member 40, the valve member 40 is kept at the valve opening position, where the valve member 40 is held on the stopper 30. Therefore, the fuel inlet port 210 is kept open and the fuel in the pump chamber 200, which is compressed by a lift of the plunger 12, flows to a lower-pressure side through the fuel inlet port 210.

A pumping stroke will be described. When energization of the coil 50 is stopped during the pumping stroke (as shown at timing Te in FIG. 2), the magnetic attractive force is not applied between the valve member 40 and the stopper 30. As a result, the sum of the forces that displace the valve member 40 toward the valve seat 23 becomes greater than the counter force that displaces the valve member 40 away from the valve seat 23. Thus, the valve member 40 is seated on the valve seat 23 by the differential pressure, and the fuel inlet port 210 is closed. Here, the sum of the forces includes the force by the fuel pressure in the fuel pump chamber 200 and the bias force of the spring 42. The counter force is caused by the fuel pressure in the fuel inlet port 210 side. When the plunger 12 is lifted toward the top dead center under this state, the fuel in the fuel pump chamber 200 is compressed so that the fuel pressure in the fuel pump chamber 200 is increased. When the pressure in the fuel pump chamber 200 becomes more than or equal to the predetermined pressure, the ball 62 is detached from the valve seat 66 against the bias force of the spring 77. Then, the fuel delivery valve 60 is opened. Therefore, the fuel compressed in the fuel pump chamber 200 is pumped through the fuel outlet port 212.

Also, the above-described strokes including the intake stroke, the return stroke and the pumping stroke are repeated so that the fuel injection pump 10 pumps the fuel.

Figure 2:
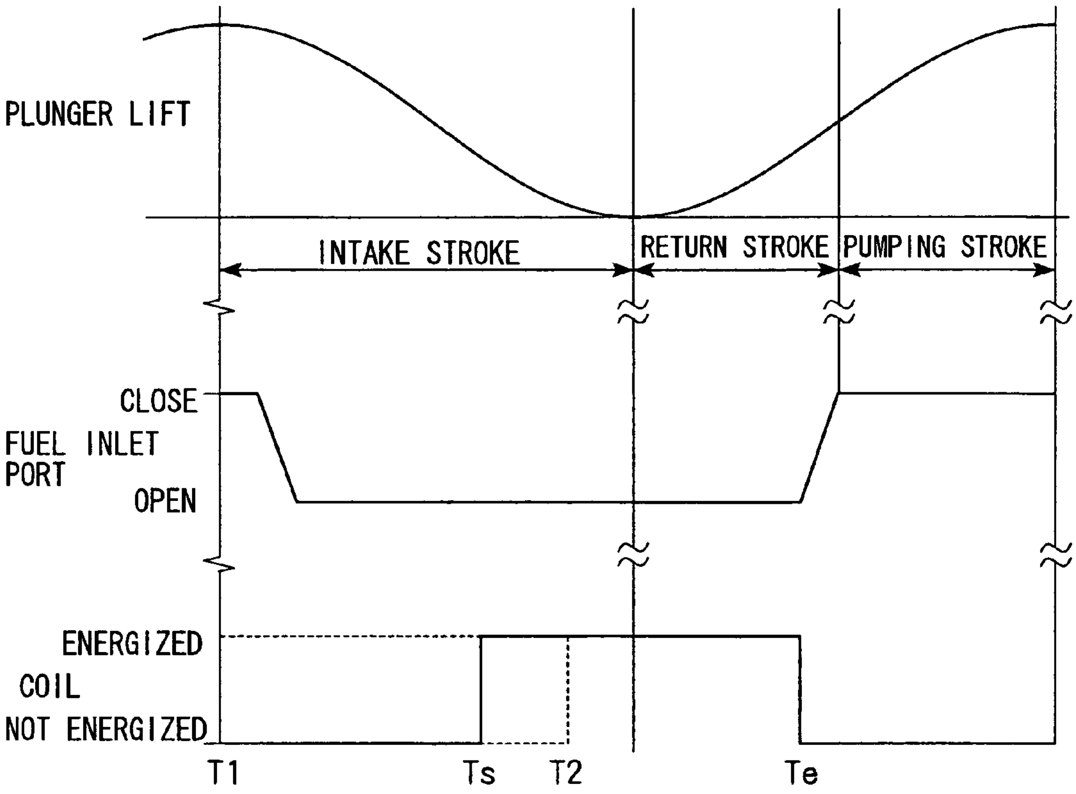
FIG. 2 is a schematic diagram for showing a relationship between a plunger lift, open-close timing of a fuel inlet port of the fuel supply apparatus and energizing timing for a coil of the fuel supply apparatus.

In FIG. 2, the timing Ts, which indicates timing for starting the energization of the coil 50, may be held anywhere between timing T1, at which the plunger reaches the top dead center, and timing T2 that is held during the intake stroke.

In the present embodiment, the magnetic attractive force between the stopper 30 and the valve member 40 is small. Thus, for example, when the coil 50 is energized at the timing T1, where the valve member 40 is seated against the valve seat 23 in the fuel inlet port 210 side, the valve member 40 is displaced toward the stopper 30 in a downstream side not by the magnetic attractive force but by the differential pressure. Then, the valve member 40 is held on the stopper 30.

The timing T2 is determined based on delay of generating the magnetic attractive force between the valve member 40 and the stopper 30 since the timing of the energization of the coil 50. The timing T2 is the latest timing that makes it possible to keep the valve opening state, where the valve member 40 is held on the stopper 30 even when the plunger goes up from the bottom dead center to the top dead center.

FIGS. 4, 5A to 5D, 6, 7A to 7D are examples where timing to stop the energization of the coil 50 is changed to adjust a fuel pump quantity. Timing Ts in FIGS. 4, 6 indicating timing for starting the energization of the coil 50 is identical to that in FIG. 2.

Figure 4:
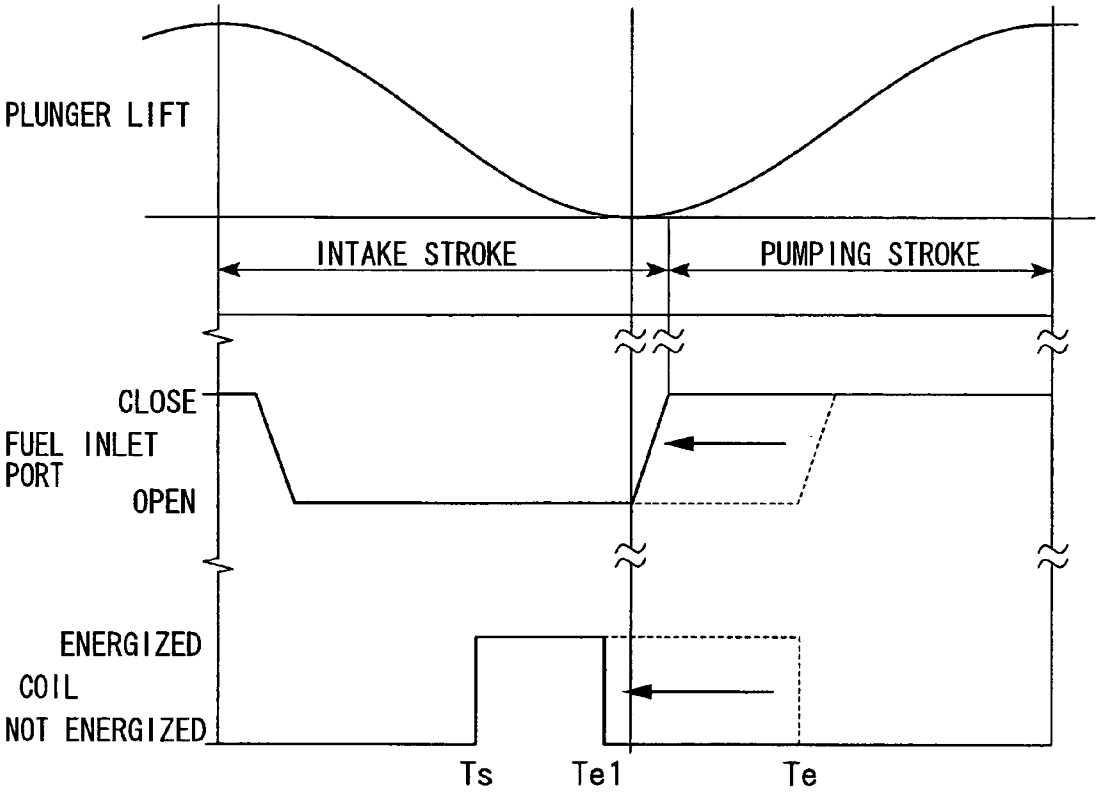
FIG. 4 is another schematic diagram for showing a relationship between the plunger lift, the open-close timing of the fuel inlet port of the fuel supply apparatus and the energizing timing for the coil of the fuel supply apparatus.
Figures 5A, 5B, 5C, 5D:
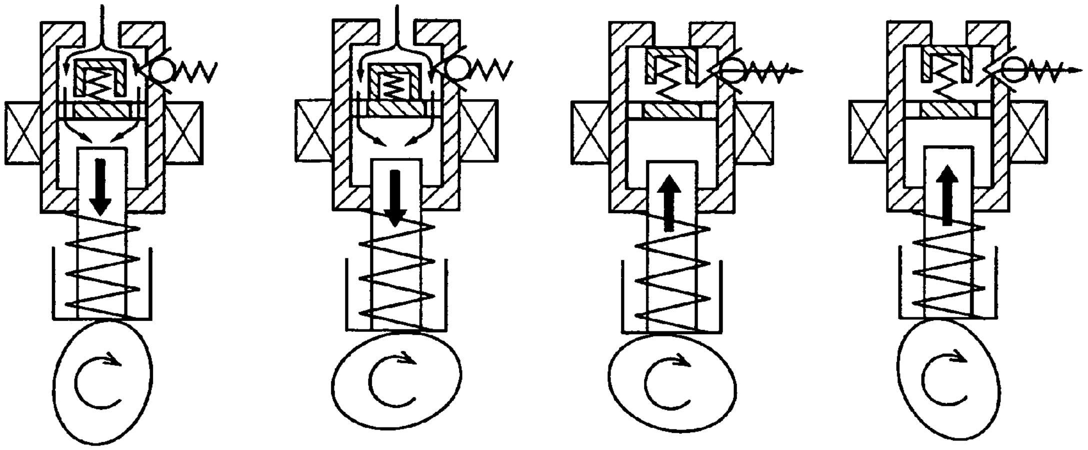
FIG. 5A is a view showing the fuel supply apparatus in a first part of an intake stroke in FIG. 4.
FIG. 5B is a view showing the fuel supply apparatus in a latter part of the intake stroke in FIG. 4.
FIG. 5C is a view showing the fuel supply apparatus in a pumping stroke in FIG. 4.
FIG. 5D is a view showing the fuel supply apparatus in the pumping stroke in FIG. 4.

In FIG. 4, the energization of the coil 50 is stopped at timing Te1, which comes before the plunger 12 reaches the bottom dead center. Here, the timing Te1 is earlier than the timing Te that indicates the timing for stopping the energization of the coil 50 in FIG. 2. Therefore, the return stroke is hardly performed so that as soon as the plunger 12 is lifted from the bottom dead center toward the top dead center, the fuel inlet port 210 is closed and the pumping stroke is started. In this case, the fuel pump quantity is maximized. Also if the coil 50 is not energized from the beginning, the fuel inlet port 210 is opened and closed in the same manner as in FIG. 4 so that the fuel pump quantity is maximized.

Figure 6:
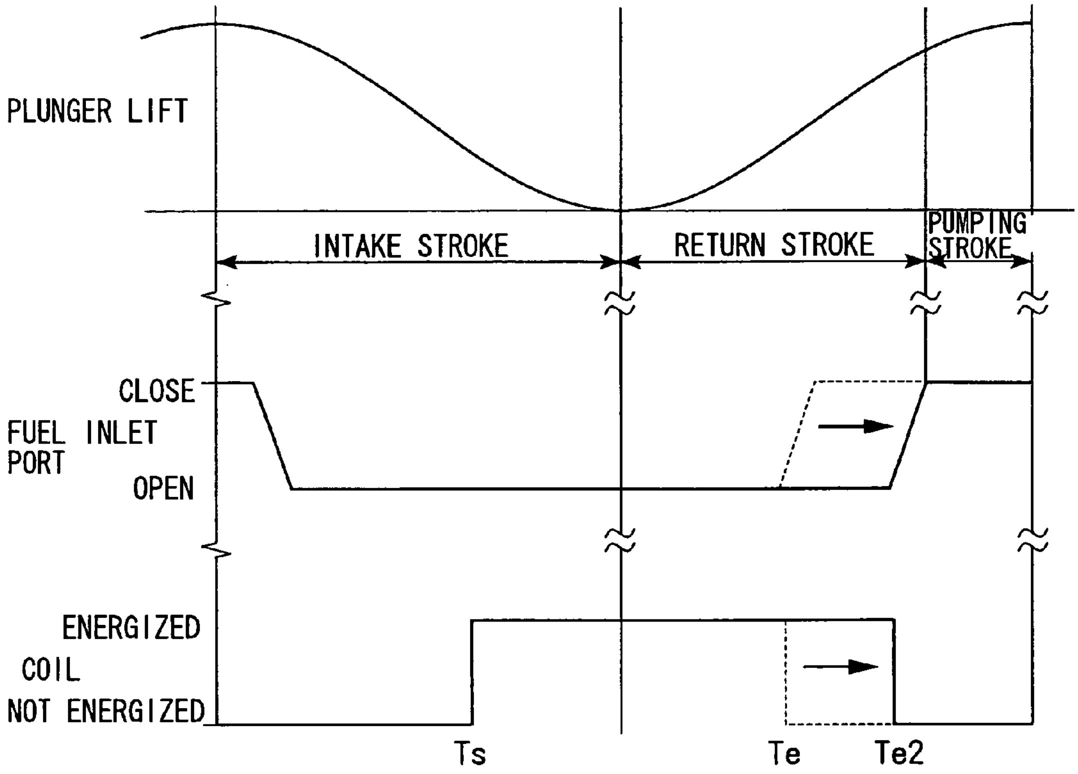
FIG. 6 is another schematic diagram for showing a relationship between the plunger lift, the open-close timing of the fuel inlet port of the fuel supply apparatus and the energizing timing for the coil of the fuel supply apparatus.
Figures 7A, 7B, 7C, 7D:
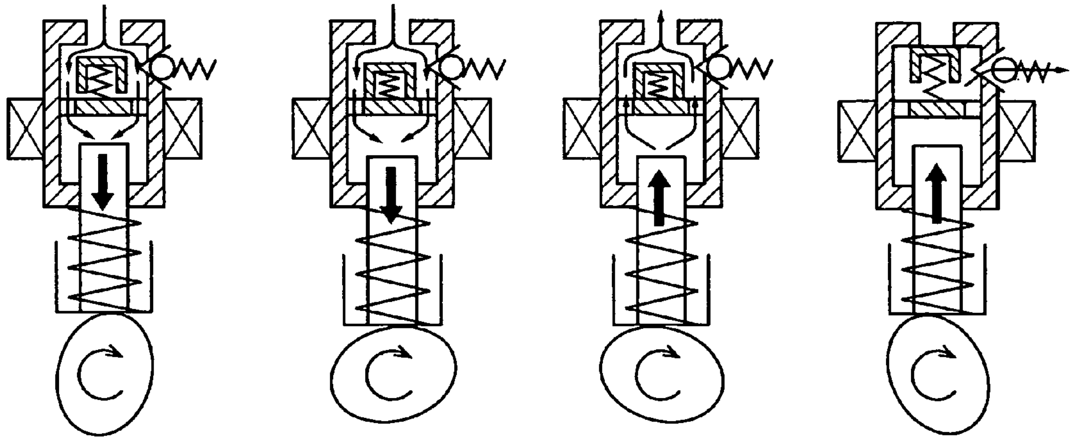
FIG. 7A is a view showing the fuel supply apparatus in a first part of an intake stroke in FIG. 6.
FIG. 7B is a view showing the fuel supply apparatus in a latter part of the intake stroke in FIG. 6.
FIG. 7C is a view showing the fuel supply apparatus in a return stroke in FIG. 6.
FIG. 7D is a view showing the fuel supply apparatus in a pumping stroke in FIG. 6.

In contrast, in FIG. 6, the energization of the coil 50 is stopped at timing Te2, which is later than the timing Te indicating the timing for stopping energization of the coil 50 in FIG. 2. Thus, the return stroke becomes longer and a period of the pumping stroke becomes shorter. Therefore, the fuel pump quantity is decreased compared with that in FIG. 2.

As discussed above, energizing timing for energizing the coil 50 is controlled so that the fuel inlet port 210 of the metering valve 20 is opened and closed to adjust the fuel pump quantity.

Second to Fourth Embodiments

Figure 8:
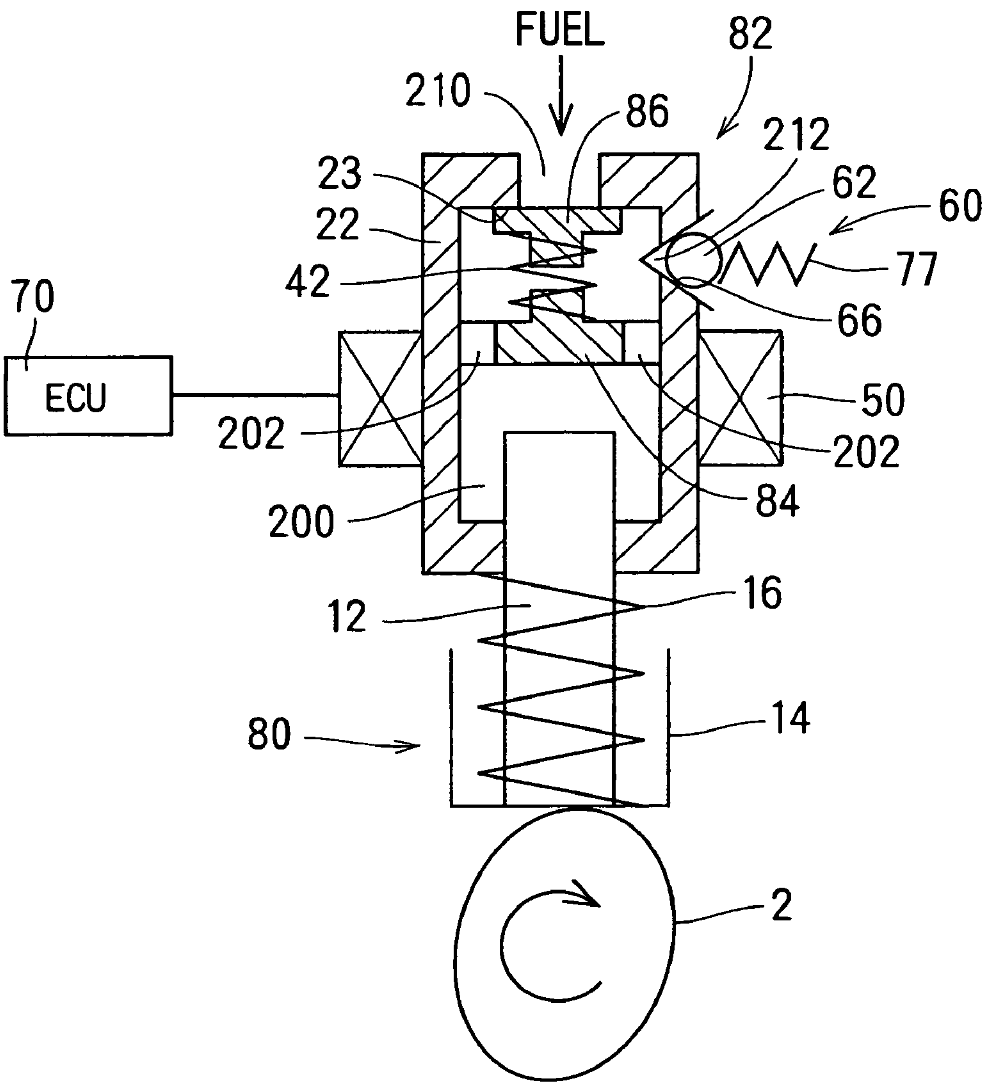
FIG. 8 is a sectional view of a fuel supply apparatus according to a second embodiment.
Figure 9:
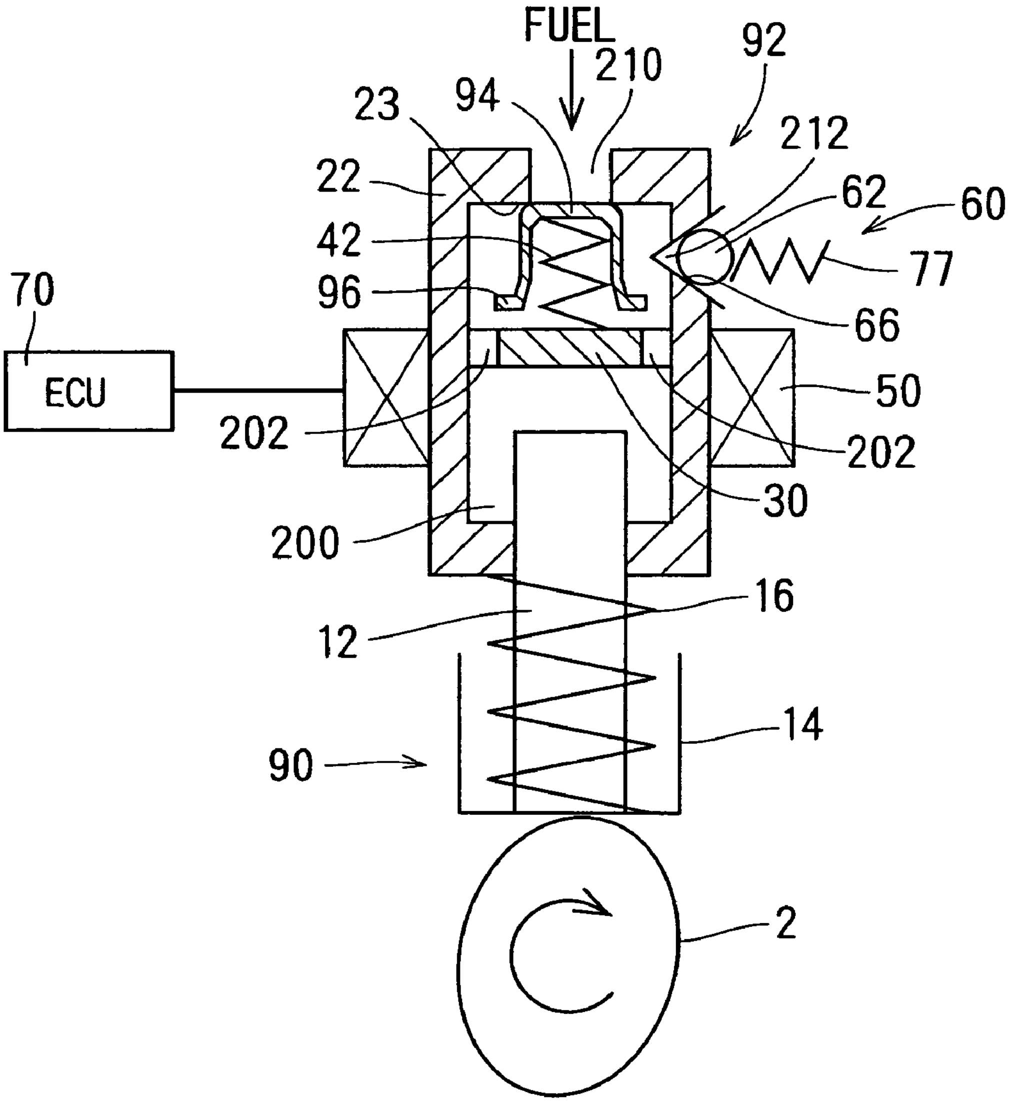
FIG. 9 is a sectional view of a fuel supply apparatus according to a third embodiment.
Figure 10:
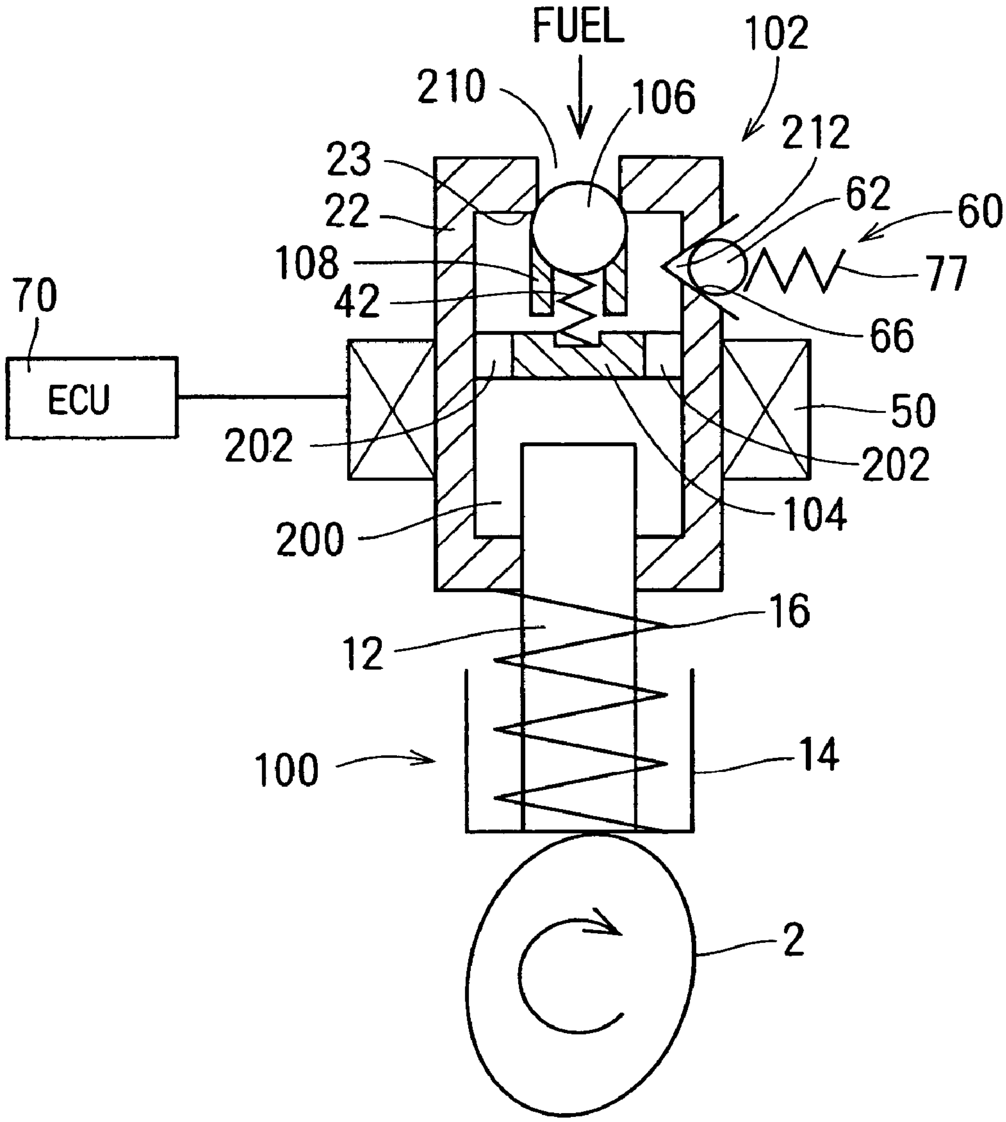
FIG. 10 is a sectional view of a fuel supply apparatus according to a fourth embodiment.

The second embodiment is shown in FIG. 8. The third embodiment is shown in FIG. 9. The fourth embodiment is shown in FIG. 10. The same numerals are used for corresponding constituent parts, which are substantially the same constituent parts in the first embodiment, and explanations thereof are omitted.

Fuel injection pumps in the second to fourth embodiments are different from the fuel injection pump 10 in respect of a structure of a metering valve.

In a fuel injection pump 80 according to the second embodiment shown in FIG. 8, a metering valve 82 includes a stopper 84 and a valve member 86. The stopper 84 and the valve member 86 have projection parts respectively, which project toward each other, and one projection part is contactable to the other projection part when the valve member is displaced.

In a fuel injection pump 90 according to the third embodiment shown in FIG. 9, a metering valve 92 includes a valve member 94, which is formed into a cup shape and has a flange 96 that faces a stopper 30. The flange 96 of the valve member 94 radially outwardly extends from an opening of the valve member 94. Due to this flange 96, a contact area of the valve member 94, which contacts the stopper 30, is increased so that the valve member 94 is limited from being inclined while the valve member 94 is held on the stopper 30.

In a fuel injection pump 100 according to the fourth embodiment shown in FIG. 10, a metering valve 102 includes a stopper 104 that has a recess part so that the recess part supports the spring 42. A valve member includes a ball 106 and a tubular member 108.

According to the first to fourth embodiments, the valve member is displaced to contact the stopper on a downstream side by the differential pressure. Then, the magnetic attractive force is generated between the stopper and the valve member that contacts the stopper so that the valve member is held at the valve opening position, where the valve member contacts the stopper. As a result, the coil 50 serving as the electromagnetic driving member can be minimized and power consumption of the coil 50 can be reduced.

Also, the magnetic attractive force does not need to be enhanced even when a lift amount of the valve member is increased to increase an amount of intake fuel supplied through the fuel inlet port 210 because the magnetic attractive force is generated between the valve member and the stopper while the valve member is held on the stopper.

Also, the valve member of the metering valve is displaced in the valve opening direction and the valve closing direction not by the magnetic attractive force, but by the differential pressure. Thus, a response speed is improved compared with a case that the valve member is displaced in the valve opening and closing directions only by the magnetic attractive force, which is generated after the coil 50 is energized.

In the first to fourth embodiments, the stopper is cut to form the fuel passages 202. However, fuel passages may be formed on an inner peripheral surface of the housing 22.

In the first to fourth embodiments, the flow-metering valve according to the present invention is used to serve as the metering valve for adjusting the fuel pump quantity of the fuel injection pump. However, the flow-metering valve according to the present invention may be used to other purposes than the fuel injection pump if the flow-metering valve adjusts the flow of the liquid, which is supplied through the fuel inlet port and outflows through the liquid outlet port.

Fifth Embodiment

Figure 11:
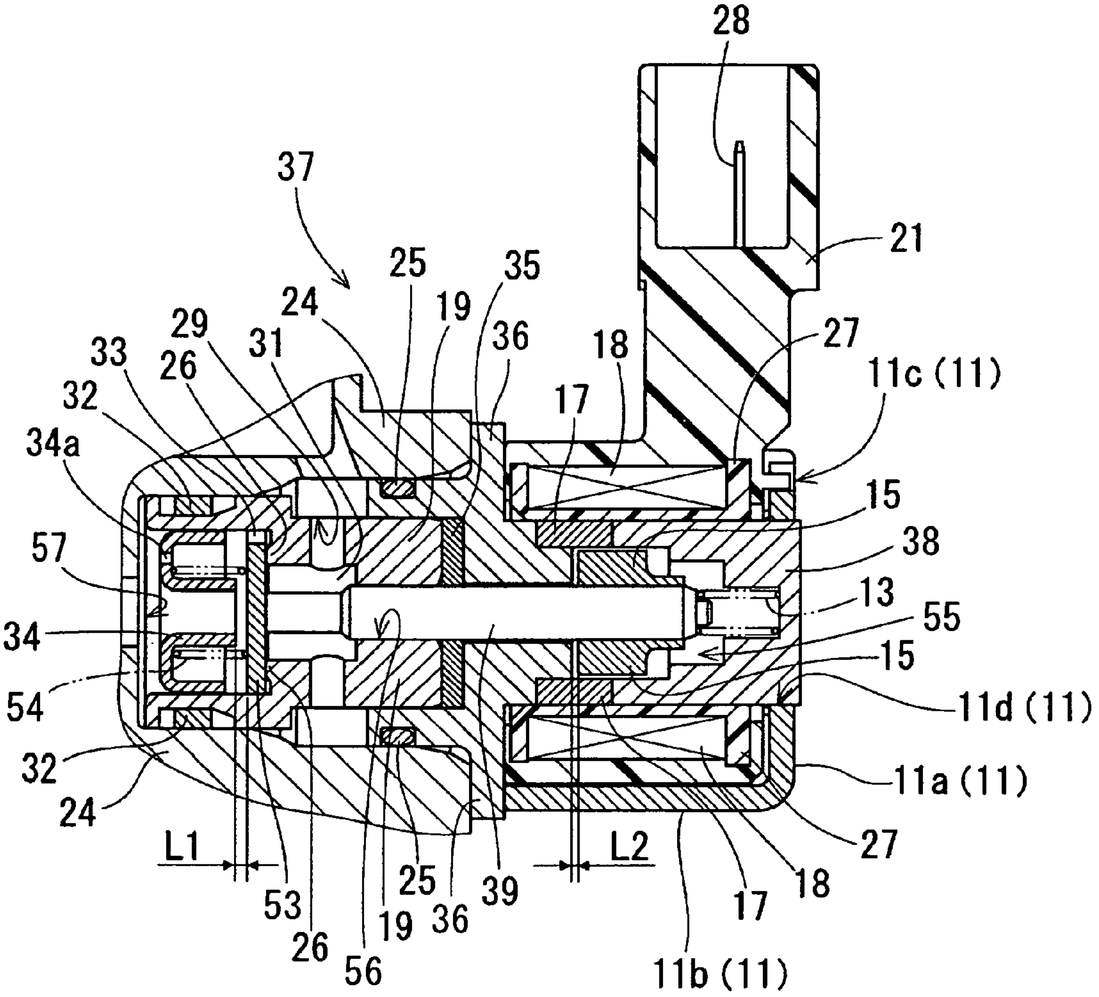
FIG. 11 is a sectional view of a solenoid valve according to a fifth embodiment of the present invention.

FIG. 11 is a sectional view of a solenoid valve 37 according to a fifth embodiment of the present invention. The solenoid valve 37 is used to serve as a fuel metering valve of a high-pressure fuel pump for supplying the fuel to injectors of an internal combustion engine (e.g., a gasoline engine or a diesel engine).

A yoke 11 includes an annular plate part 11*a*, a bottom part 11*b*, a notch 11*c* and an annular engaging hole 11*d*. The annular plate part 11*a* includes the notch 11*c*, which is located at an outer peripheral of the annular plate part 11*a*, and is located on one side of the annular plate part 11*a*, which is radially opposite from the other side of the annular plate part 11*a*, where the bottom part 11*b* is formed. A projection part of a resin cover 21 is engaged with the notch 11*c*. Also, the annular engaging hole 11*d* is formed at a center part of the annular plate part 11*a*. Across section of the bottom part 11*b* is formed into an arc shape, and the bottom part 11*b* perpendicularly extends from the annular plate part 11*a* toward a stationary core 36. An end part of the bottom part 11*b* on a stationary core 36 side contacts the stationary core 36. The yoke 11, the stationary core 36, a mobile core 15 and a magnetic member 38 are made of a magnetic material to form a magnetic circuit.

The magnetic member 38 is formed into a tubular shape and is engaged with the engaging hole 11*d* of the annular plate part 11*a*. The magnetic member 38 includes a recess part 55 on a valve body 19 side thereof. The recess part 55 includes a large diameter part, a middle diameter part and a small diameter part. The middle diameter part has a smaller inner diameter than the large diameter part, and the small diameter part has a smaller inner diameter than the middle diameter part. The large diameter part, the middle diameter part and the small diameter part are longitudinally arranged in this order from the valve body 19 side of the magnetic member 38 toward the other side, which is opposite from the valve body 19 side.

One longitudinal end part of a coil spring 13 serving as the second bias member is received in the small diameter part of the recess part 55. The coil spring 13 biases a needle 39 toward a valve member 53.

The needle 39 is formed into a tubular shape and one longitudinal end part thereof is inserted into an insertion opening 56 of the valve body 19.

The mobile core 15 is fixed with the other end part of the needle 39 outside of the valve body 19 and is displaceable together with the needle 39. An end part of the mobile core 15 on a magnetic member 38 side is received in the large diameter part of the recess part 55. In this particular embodiment, the mobile core 15 and the needle 39 are independently formed. However, the mobile core 15 and the needle 39 may be integrally formed.

The stationary core 36 is arranged on a valve member 53 side of the mobile core 15. The stationary core 36 has a through hole in a center, through which the needle 39 penetrates. An end part of the stationary core 36 on the valve body 19 side is engaged with a pump housing 24 of the high-pressure fuel pump. A gap between the stationary core 36 and the pump housing 24 is sealed by an O ring 25 serving as a sealing member.

A non-magnetic member 17 is made of a non-magnetic material and is formed into a tubular shape, and surrounds the mobile core 15 and the stationary core 36. The non-magnetic member 17 is held between the magnetic member 38 and the stationary core 36 in such a manner that the non-magnetic member 17 prevents shortcircuiting of a magnetic flux between the magnetic member 38 and the stationary core 36.

A coil 18 is wound around a bobbin 27 in such a manner that the coil 18 covers outer peripheral parts of the magnetic member 38 and of the non-magnetic member 17. The resin cover 21 covers the coil 18 and the bobbin 27, and a terminal 28 is formed on the resin cover 21 through an insert molding. The terminal 28 is electrically connected with the coil 18. A driving circuit, which energizes the coil 18, is connected to the terminal 28. An electromagnetic driving member includes the mobile core 15, the stationary core 36 and the coil 18 for applying the needle 39 with a force toward the valve member 53.

An end part of the valve body 19 on a stationary core 36 side is press fitted into the stationary core 36. A washer 35 is inserted between the valve body 19 and the stationary core 36 to adjust a maximum displacement of the mobile core 15. The valve body 19 includes an inlet port 29, which opens in a transverse direction, an outlet port 57, which opens in a longitudinal direction, and an insertion port 56, which receives one end part of the needle 39. A liquid passage 31 provides communication between the inlet port 29 and the outlet port 57. The inlet port 29 is communicated with a fuel chamber 41 (see FIG. 12) of the high-pressure fuel pump. The outlet port 57 is communicated with a pump chamber 45 (see FIG. 12). The insertion port 56 is communicated with the liquid passage 31. Also, a valve seat 26 is located in the liquid passage 31 of the valve body 19 in such a manner that the valve member 53 is seated on the valve seat 26 from an outlet port 57 side. An end part of the valve body 19 on a side, which is opposite from the stationary core 36 side of the valve body 19, is engaged with the pump housing 24 of the high-pressure fuel pump. A gap between the valve body 19 and the pump housing 24 is sealed by an O ring 32 serving as a sealing member. The gap between the valve body 19 and the pump housing 24 may be sealed by use of a pressure and an axial force.

The valve member 53 is reciprocally displaceably received in the liquid passage 31, and is displaceable in a longitudinal direction of the needle 39. The valve member 53 is not joined with the needle 39. The valve member 53 and the needle 39 are independent of each other, and are reciprocably displaceable independently of each other. If the valve member 53 were connected with the needle 39, an inertial mass of the valve member 53 would be increased. Thus, a response speed of the valve member 53 would deteriorate when the valve member 53 would be detached from the valve seat by a differential pressure between the pump chamber 45 and the fuel chamber 41. Likewise, the response speed of the valve member 53 would also deteriorate when the valve member 53 when the valve member 53 would be seated on the valve seat. In contrast, when the valve member 53 is not connected with the needle 39, an inertial mass of the valve member 53 is decreased. Thus, the response speed of the valve member 53 is increased when the valve member 53 is detached from the valve seat or is seated on the valve seat. The valve member 53 is formed into a circular plate shape, and includes a notch 33 on an outer peripheral. When the valve member 53 is displaced toward the outlet port 57 to be detached from the valve seat 26, the inlet port 29 is communicated with the outlet port 57 through the notch 33. When the valve member 53 is seated on the valve seat 26, the inlet port 29 is discommunicated from the outlet port 57. Likewise, the liquid passage 31 is opened and closed.

A spring seat 34 is formed into a closed annular groove shape, and is pressed into the outlet port 57 of the valve body 19. The spring seat 34 includes a hole 34*a* formed at a bottom of a groove of the spring seat 34, and the fuel in the fuel chamber 41 is supplied to the pump chamber 45 through the hole 34*a*. Also, the fuel in the pump chamber 45 is returned to the pump chamber 41 through the hole 34*a*. The spring seat 34 supports one end part of the coil spring 54, and a tubular portion located at a center of the spring seat 34 contacts the valve member 53 to regulate an amount of a lift of the valve member 53.

The coil spring 54 serving as the first bias member is supported by the spring seat 34 in such a manner that the tubular portion located at the center of the spring seat 34 is inserted inside the coil spring 54. The other end part of the coil spring 54 contacts the valve member 53. The coil spring 54 biases the valve member 53 in a valve closing direction (a first direction).

Then, a bias force of the coil spring 54, a bias force of the coil spring 13 and a magnetic force (magnetic attractive force) generated by energization of the coil 18 will be described.

The bias force of the coil spring 54 serving as the first bias member is indicated as F1 and the bias force of the coil spring 13 serving as the second bias member is indicated as F2. In this case, a relationship between the F1 and the F2 is expressed by an equation 1, which is shown below.

$$F1>F2 \quad \text{Equation 1}$$

When the valve member 53 receives no force except for the F1 and the F2, the valve member 53 is seated on the valve seat 26 by the bias force of the coil spring 54, because the relationship between the F1 and the F2 is expressed as the equation 1. When the coil 18 is energized, a magnetic force is generated in a left direction in FIG. 11. The magnetic force generated by the energization of the coil 18 is indicated as F3, and a relationship between the F1, the F2 and the F3 is expressed by the following equation 2 as shown below.

$$F1<F2+F3 \quad \text{Equation 2}$$

When the coil 18 is energized, the needle 39 is pushed in the left direction in FIG. 11 by forces of the F2 and the F3. In contrast, the valve member 53 is pushed in a right direction by a force of the F1. Thus, when the relationship between the F1, the F2 and the F3 is expressed by the equation 2, the valve member 53 is not able to push back the needle 39, and thereby is prevented from being seated by the needle 39.

Then, a maximum lift amount of the mobile core 15 and a maximum displacement amount of the valve member 53 will be described.

L1 in FIG. 11 shows the maximum lift amount of the valve member 53. The L1 corresponds to a distance between the valve member 53 that is seated on the valve seat 26 and an end surface of the tubular portion of the spring seat 34. L2 shows the maximum displacement amount of the mobile core 15. The 12 will be described. In FIG. 11, the valve member 53 is seated on the valve seat 26, and the needle 39 is biased by the coil spring 13 to contacts the valve member 53. Under this arrangement, the distance between the mobile core 15 and the stationary core 36 is the L2. Because the needle 39 is biased by the coil spring 13, the distance between the mobile core 15 and the stationary core 36 will not expand to be greater than the L2. A relationship between the L1 and the L2 is expressed by an equation 3 as follows.

$$L1>L2 \quad \text{Equation 3}$$

When the coil 18 is energized and the mobile core 15 is attracted to the stationary core 36, the mobile core 15 is displaced by a length of the L2 toward the valve body 19. If the L1 were smaller than the L2, the valve member 53 would contact the spring seat 34 before the mobile core 15 contacts the stationary core 36. In this case, the mobile core 15 would not contact the stationary core 36, and thereby there would be an air gap between the mobile core 15 and the stationary core 36. However, when the L1 is larger than the L2, the mobile core 15 can contacts the stationary core 36 so that a length of the air gap between the mobile core 15 and the stationary core 36 can be zero or almost zero.

The high-pressure fuel pump, which includes the solenoid valve 37, will be described.

Figure 12:
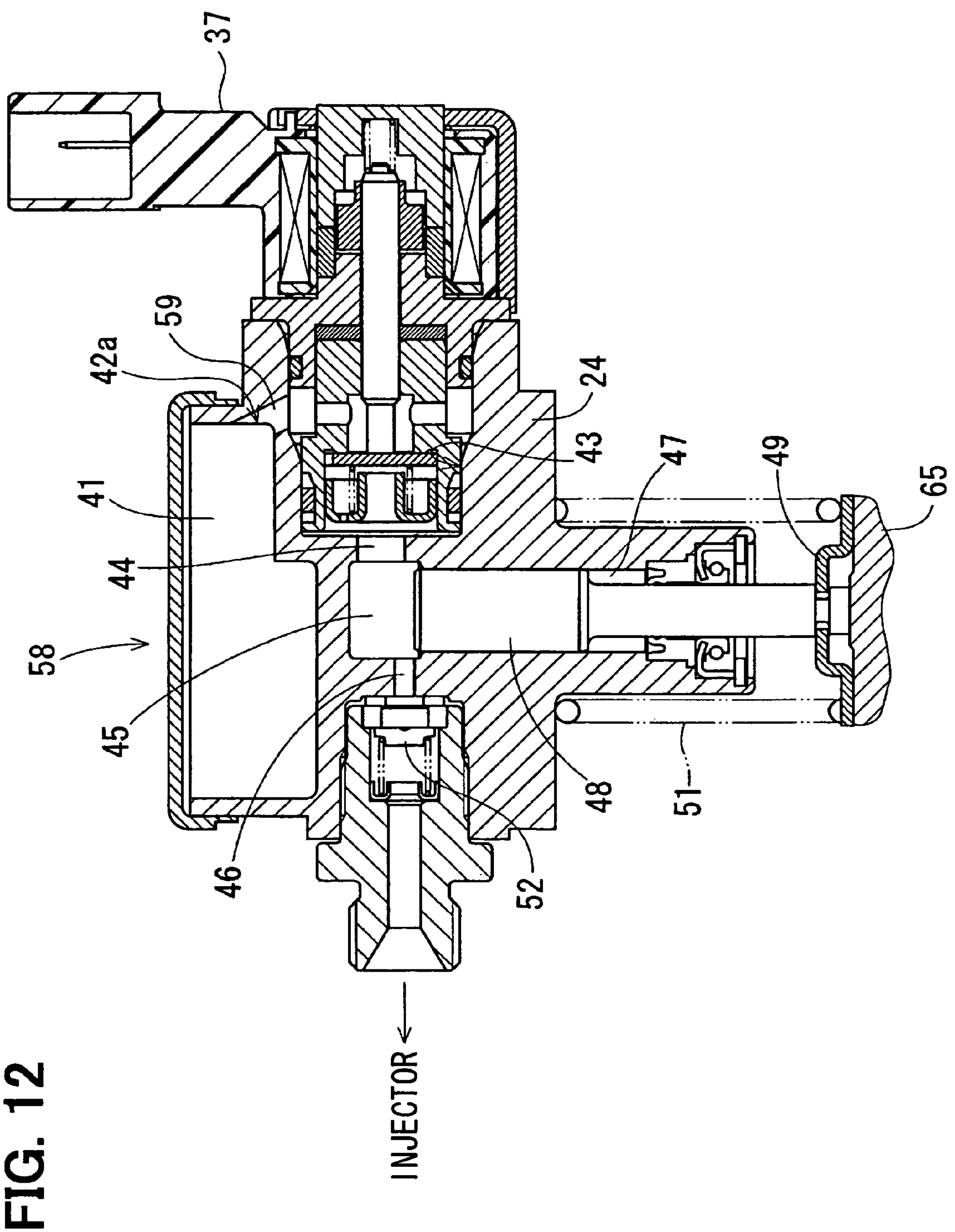
FIG. 12 is a sectional view of a high-pressure fuel pump according to the fifth embodiment of the present invention.

FIG. 12 is a sectional view of the high-pressure fuel pump 58, which includes the solenoid valve 37.

The pump housing 24 of the high-pressure fuel pump 58 includes the fuel chamber 41, an introduction passage 59, a recess part 43, a fuel passage 44, the pump chamber 45, a delivery passage 46 and a cylinder 47. The introduction passage 59 is communicated with the inlet port 29. The recess part 43 is engaged with the valve body 19 and the stationary core 36 of the solenoid valve 37. The fuel passage 44 is communicated with a bottom of the recess part 43. The pump chamber 45 is communicated with the fuel passage 44. The delivery passage 46 is communicated with the pump chamber 45. The cylinder 47 is communicated with the pump chamber 45. The fuel in the fuel chamber 41 is supplied to the introduction passage 59 through the fuel inlet port 42*a*.

The cylinder 47 receives the plunger 48. The plunger 48 is reciprocally displaceably inserted in the cylinder 47, and is displaceable with a spring seat 49 and a tappet 65. The tappet 65 is pressed toward a cam (not shown) by a bias force of a coil spring 51 in such a manner that the tappet 65 is slidably displaceable along with the cam according to a rotation of the cam. A pressure in the pump chamber 45 is decreased when the plunger 48 goes down from a top dead center to a bottom dead center, and is increased in contrast when the plunger 48 goes up from the bottom dead center to the top dead center.

The fuel delivery valve 52 is located in the delivery passage 46. When the pressure in the pump chamber 45 becomes more than or equal to a predetermined pressure, the fuel delivery valve 52 is opened, and the fuel compressed in the pump chamber 45 is delivered.

Next, an operation of the solenoid valve 37 will be described.

The first part of an intake stroke will be described.

Figure 13:
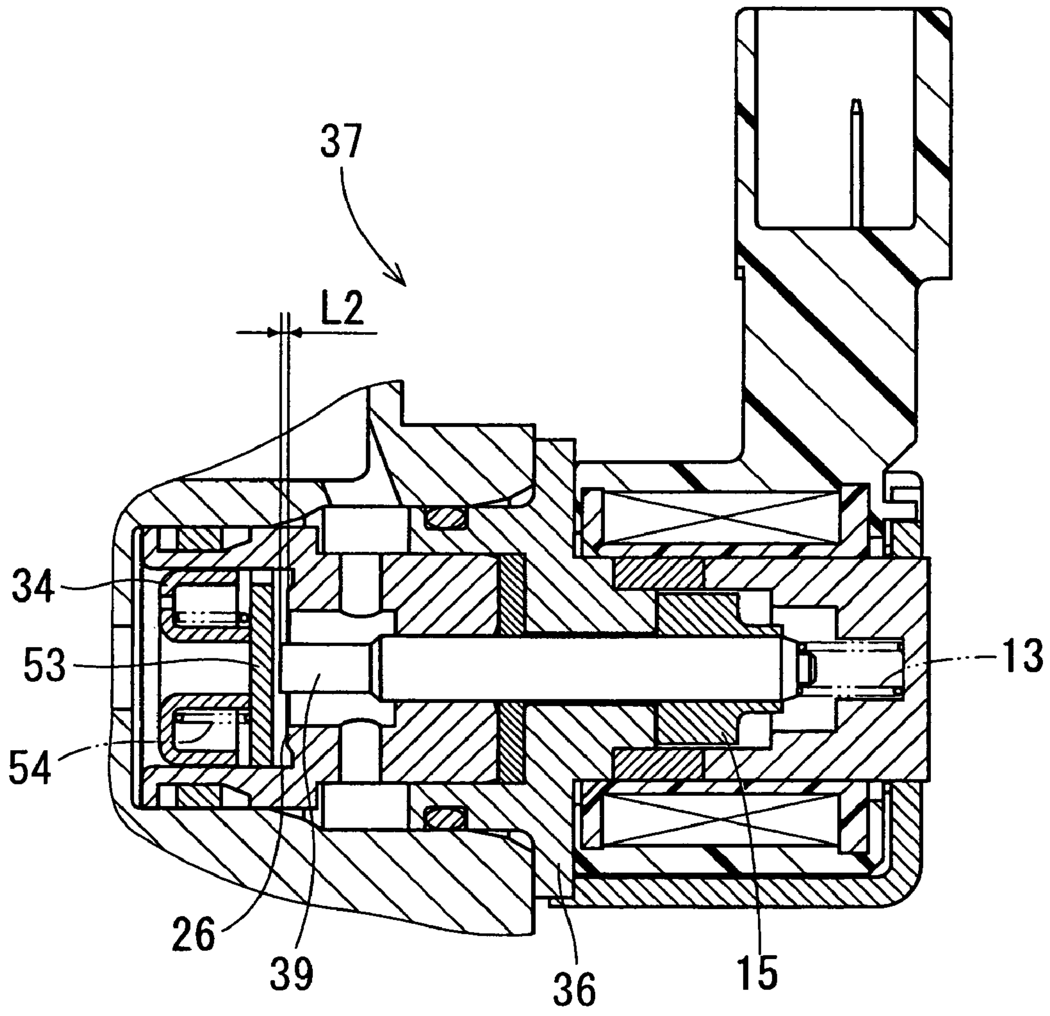
FIG. 13 is the sectional view of the solenoid valve according to the fifth embodiment of the present invention.

The intake stroke is started when the plunger 48 of the high-pressure fuel pump 58 starts going down from the top dead center to the bottom dead center. At the time of starting the intake stroke, the valve member 53 is seated on the valve seat 26 as shown in FIG. 11. When the plunger 48 goes down, a fuel pressure in the pump chamber 45 is decreased. Thus, a differential pressure between fuel pressures in the pump chamber 45 and the fuel chamber 41 detaches the valve member 53 from the valve seat 26 against a bias force of a coil spring 54. At the maximum, the valve member 53 can be displaced (or lifted) up to the point where the valve member 53 contacts the spring seat 34 as shown in FIG. 13.

When the valve member 53 is lifted, the displacement of the needle 39 in a valve opening direction (a second direction) becomes free from limitation by the valve member 53. Thus, the needle 39 is displaced in the valve opening direction by a bias force of the coil spring 13. Therefore, the length of the air gap between the mobile core 15 and the stationary core 36 becomes smaller before the coil 18 is energized. As discussed above, there is the relation of the L1> the L2, and thereby the needle 39 is displaceable in the valve opening direction by a length of the L2. Then, the mobile core 15 contacts the stationary core 36, and thereby the displacement of the needle 39 is limited. As a result, the length of the air gap between the mobile core 15 and the stationary core 36 becomes almost zero as shown in FIG. 13. Also, a tip of the needle 39 projects out the valve seat 26 toward the valve member 53 by the length of the L2.

The latter part of the intake stroke will be described.

The above-described intake stroke is finished when the plunger 48 reaches the bottom dead center. A driving circuit starts energizing the coil 18 immediately before the intake stroke is finished. When the coil 18 starts being energized, the mobile core 15 is pulled toward the stationary core 36 by the magnetic force so that the mobile core 15 contacts the stationary core 36. At this time, as discussed above, the length of the air gap between the mobile core 15 and the stationary core 36 is made almost zero by the force of the coil spring 13. Thus, time, which it takes for the mobile core 15 to contact the stationary core 36 after the energization of the coil 18, is almost zero. Also time, which it takes for the mobile core 15 to finish the displacement in the valve opening direction after the energization of the coil 18, is almost zero. Thus, even in a high speed rotation operational state, the needle 39 achieves a sufficient response speed.

The first part of a return stroke will be described.

Figure 14:
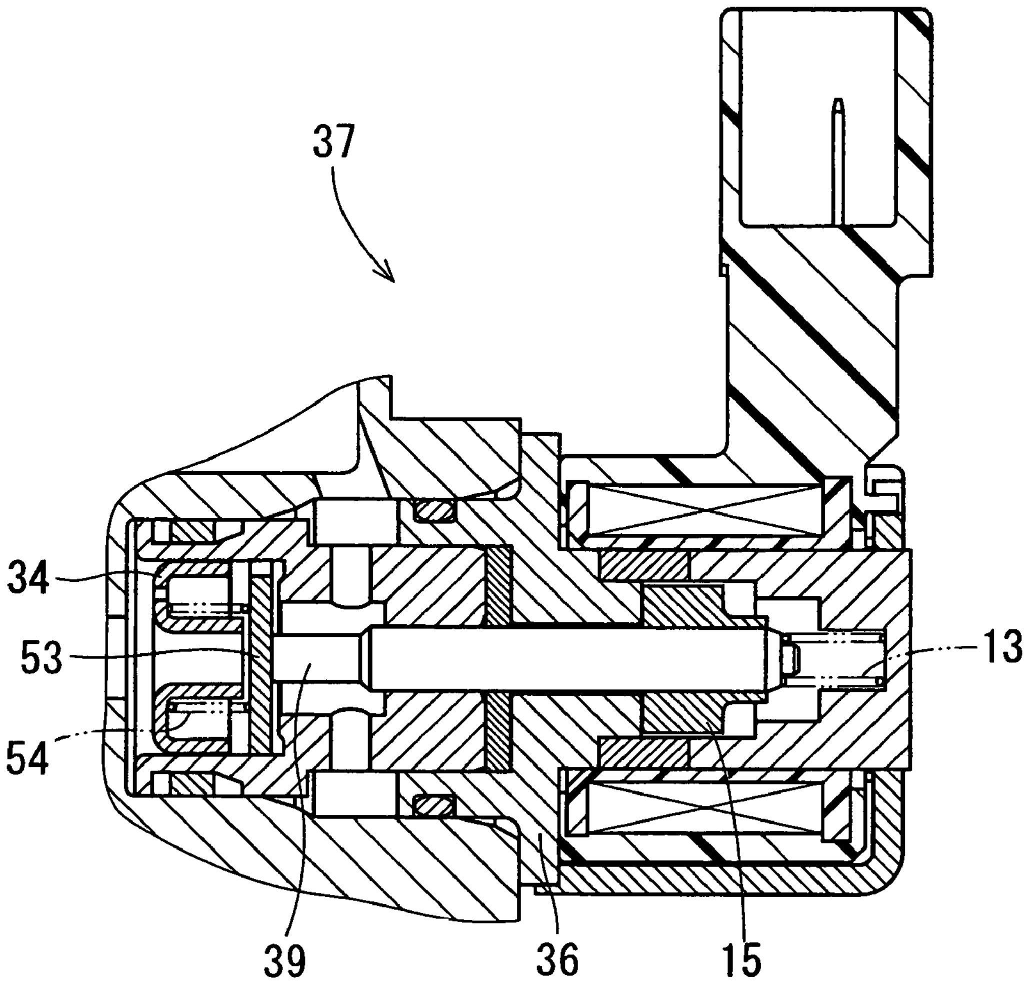
FIG. 14 is the sectional view of the solenoid valve according to the fifth embodiment of the present invention.

The return stroke is started when the plunger 48 goes up from the bottom dead center to the top dead center. When the return stroke is started, the fuel pressure in the pump chamber 45 is increased. Because the fuel pressure in the pump chamber 45 is increased, the differential pressure between the fuel pressures in the pump chamber 45 and the fuel chamber 41 is decreased. Thus, the valve member 53 is displaced in the valve closing direction by the bias force F1 of the coil spring 54. In this case, because the coil 18 is energized at the latter part of the intake stroke, the needle 39 receives the magnetic force F3 in addition to the bias force F2. Therefore, the valve member 53 cannot push back the needle 39 in the valve closing direction, and thereby the needle 39 prevents the valve member 53 from being seated as shown in FIG. 14. Thus, the solenoid valve 37 is not closed and the fuel in the pump chamber 45 is returned to the fuel chamber 41 as the plunger 48 goes up in the first part of the return stroke.

The latter part of the return stroke will be described.

The driving circuit stops the energization of the coil 18 at appropriate timing before the plunger 48 reaches the top dead center in the return stroke. The timing for stopping the energization, of the coil 18 is adjustable, and thereby a fuel pump quantity can be adjusted by adjusting the timing for stopping the energization. When the energization is stopped, the magnetic force F3 disappears. The valve member 53 is seated on the valve seat 26 by the bias force of the coil spring 54.

A pump stroke will be described.

The pump stroke is started when the valve member 53 is seated to stop the return stroke. When the pump stroke is started, the fuel pressure in the pump chamber 45 is increased as the plunger 48 goes up, because the valve member 53 is seated on the valve seat 26. When the fuel pressure goes up, the fuel delivery valve 52 is opened. Therefore, the high-pressure fuel, which is compressed in the pump chamber 45, is pumped. When the plunger 48 reaches the top dead center, the pump stroke is finished and the first part of the intake stroke will be performed again.

Sixth Embodiment

A sixth embodiment of the present invention will be described with reference to the accompanying drawings. Similar components of a solenoid valve of the present embodiment, which are similar to the components of the solenoid valve of the fifth embodiment, will be indicated by the same numerals.

Figure 15:
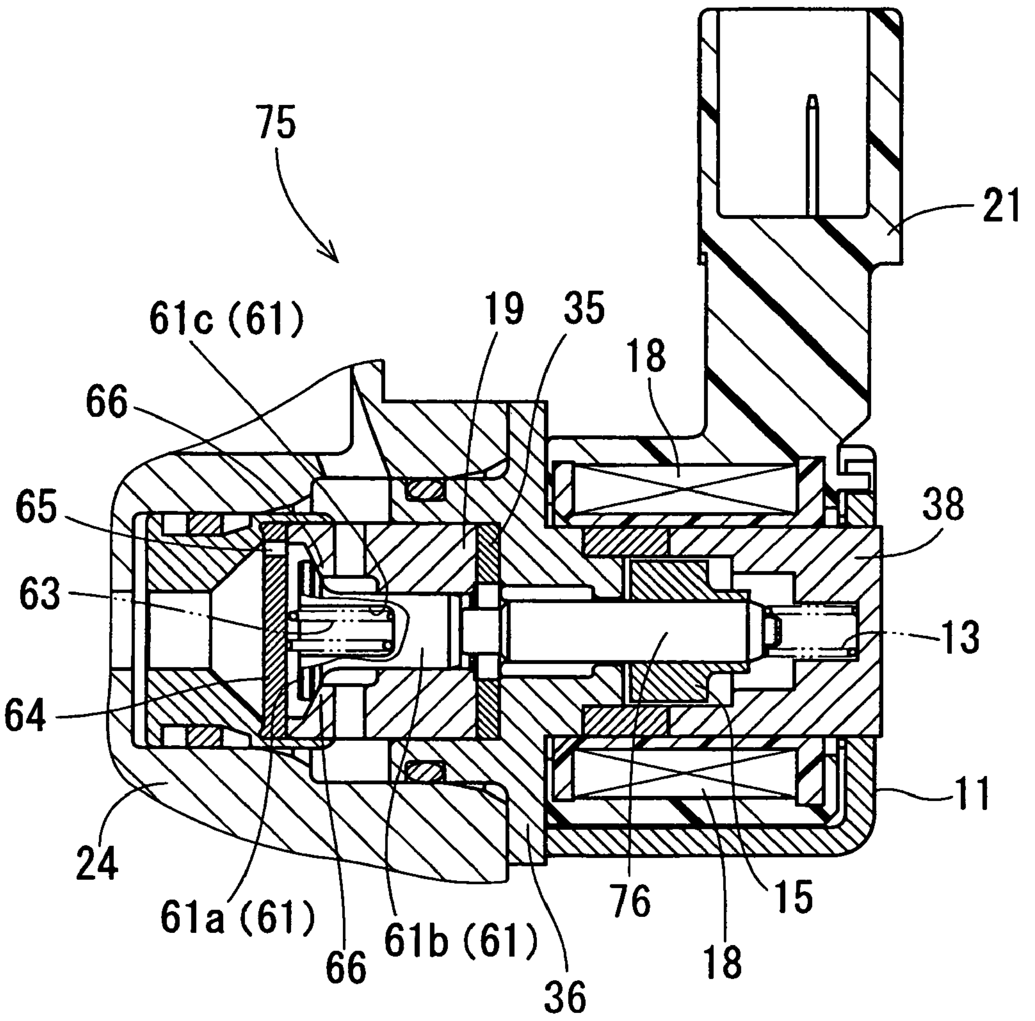
FIG. 15 is a sectional view of a solenoid valve according to a sixth embodiment of the present invention.

FIG. 15 is a sectional view of a solenoid valve according to the sixth embodiment of the present invention. A valve member 61 of a solenoid valve 75 according to the sixth embodiment includes a valve part 61*a* and a stem part 61*b*. The valve part 61*a* is formed into a generally disc shape and the stem part 61*b* extends in a longitudinal direction of a needle 76. The valve member 61 is formed into a generally T-shape as shown in FIG. 15. The valve member 61 has a recess part 61*c* located on one side of the valve member 61, which is opposite from the other side, where the needle 62 is located. The recess part 61*c* receives one end of a coil spring 63, which serves as the first bias member. FIG. 15 shows the valve member 61, which is biased by the coil spring 63 and is seated on a valve seat 66. A stopper 64, which is disc shaped, is located on one side of the valve member 61, which is opposite from the other side, where the needle 62 is located. The stopper 64 supports the other end of the coil spring 63, and regulates a lift amount of the valve member 61. The stopper 64 includes a notch 65 at a position, which is not covered by the valve member 61 even when the valve member 61 contacts the stopper 64.

Except for the above-described points, the solenoid valve 75 according to the sixth embodiment is substantially identical to the solenoid valve 37 according to the fifth embodiment.

Seventh Embodiment

A seventh embodiment of the present invention will be described with reference to the accompanying drawings. Similar components of a solenoid valve of the present embodiment, which are similar to the components of the solenoid valve of the fifth embodiment, will be indicated by the same numerals.

Figure 16:
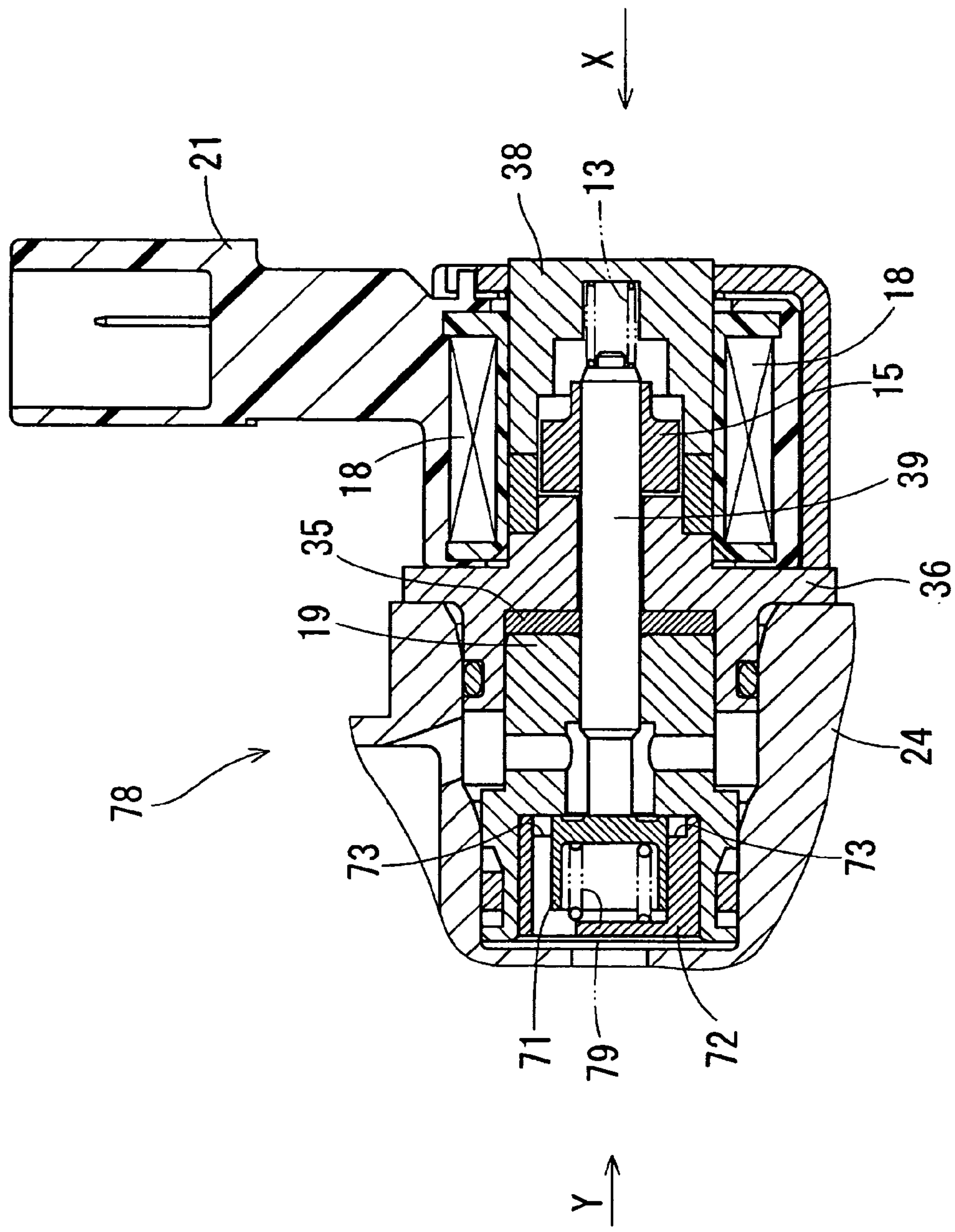
FIG. 16 is a sectional view of a solenoid valve according to a seventh embodiment of the present invention.

FIG. 16 is a sectional view of a solenoid valve according to the seventh embodiment of the present invention. A solenoid valve 78 according to the seventh embodiment includes a guide member 72, which guides a reciprocal displacement of a valve member 71 in a longitudinal direction of the needle 39 and is formed into a tubular shape with a bottom. The guide member 72 shown in FIG. 16 shows a schematic view taken along line XVI-XVI in FIG. 17A.

Figure 17A:
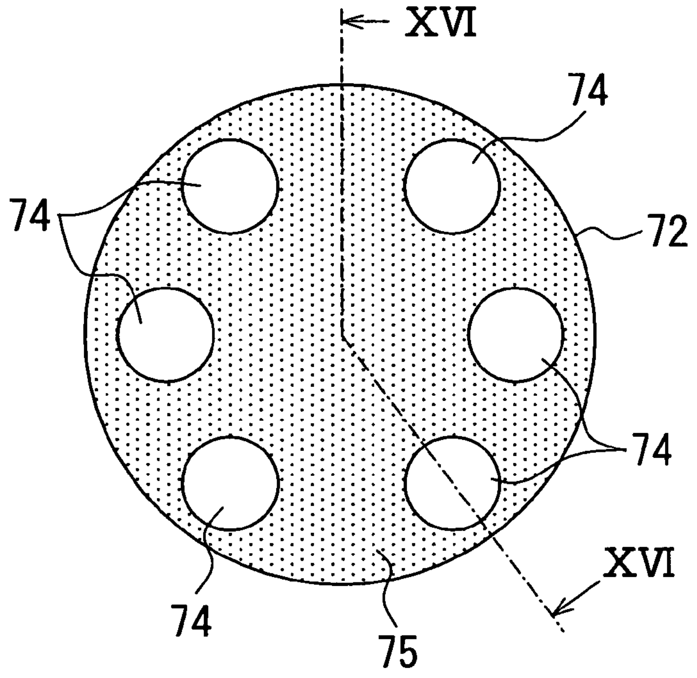
FIG. 17A is a schematic view of a guide member viewed from a direction Y in FIG. 16 according to the seventh embodiment of the present invention.
Figure 17B:
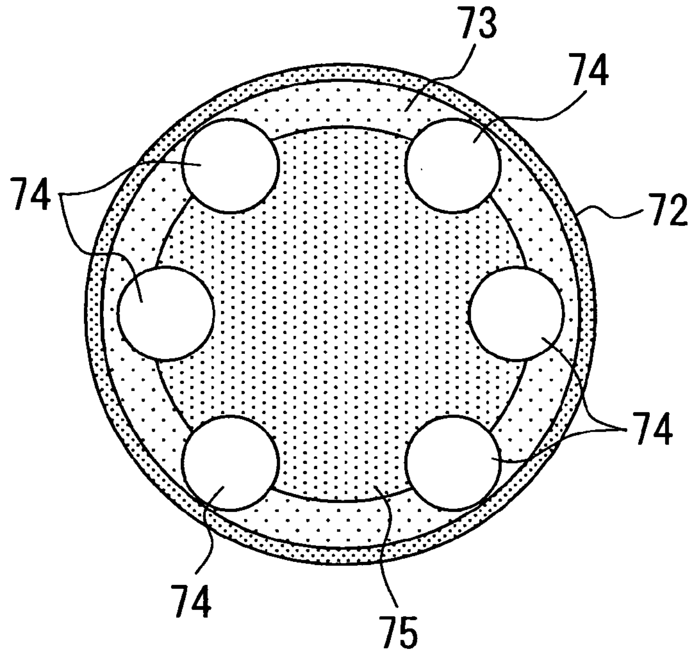
FIG. 17B is a sectional view of the guide member viewed from a direction X in FIG. 16 according to the seventh embodiment of the present invention.

FIG. 17A is a schematic view showing the guide member 72 viewed from a direction Y in FIG. 16. As shown in FIG. 17A, a bottom wall of the guide member 72 includes six holes 74 arranged at identical intervals in a circumferential direction. FIG. 17B is a schematic view showing the guide member 72 viewed from a direction X in FIG. 16. A tubular part of the guide member 72 has a step part 73, which radially outwardly projects in the tubular part. An inner wall of the step part 73 has six recess parts in such a manner that the corresponding holes 74 at the bottom wall go through the inner wall along the recess parts. Therefore, when the guide member 72 is viewed from the direction X, a whole outline of each hole 74 can be seen as shown in FIG. 17B.

The valve member 71, which is tubular shaped with the bottom, is slidably engaged with an inner wall of the step part 73. The tubular part of the valve member 71 receives a coil spring 79, which serves as the first bias member. The valve member 71 contacts the bottom wall of the guide member 72 so that a lift of the valve member 71 is regulated.

Except for the above-described points, the solenoid valve 78 according to the seventh embodiment is substantially identical to the solenoid valve 37 according to the fifth embodiment.

Eighth Embodiment

An eighth embodiment of the present invention will be described with reference to the accompanying drawings. Similar components of a solenoid valve of the present embodiment, which are similar to the components of the solenoid valve of the fifth embodiment, will be indicated by the same numerals.

Figure 18:
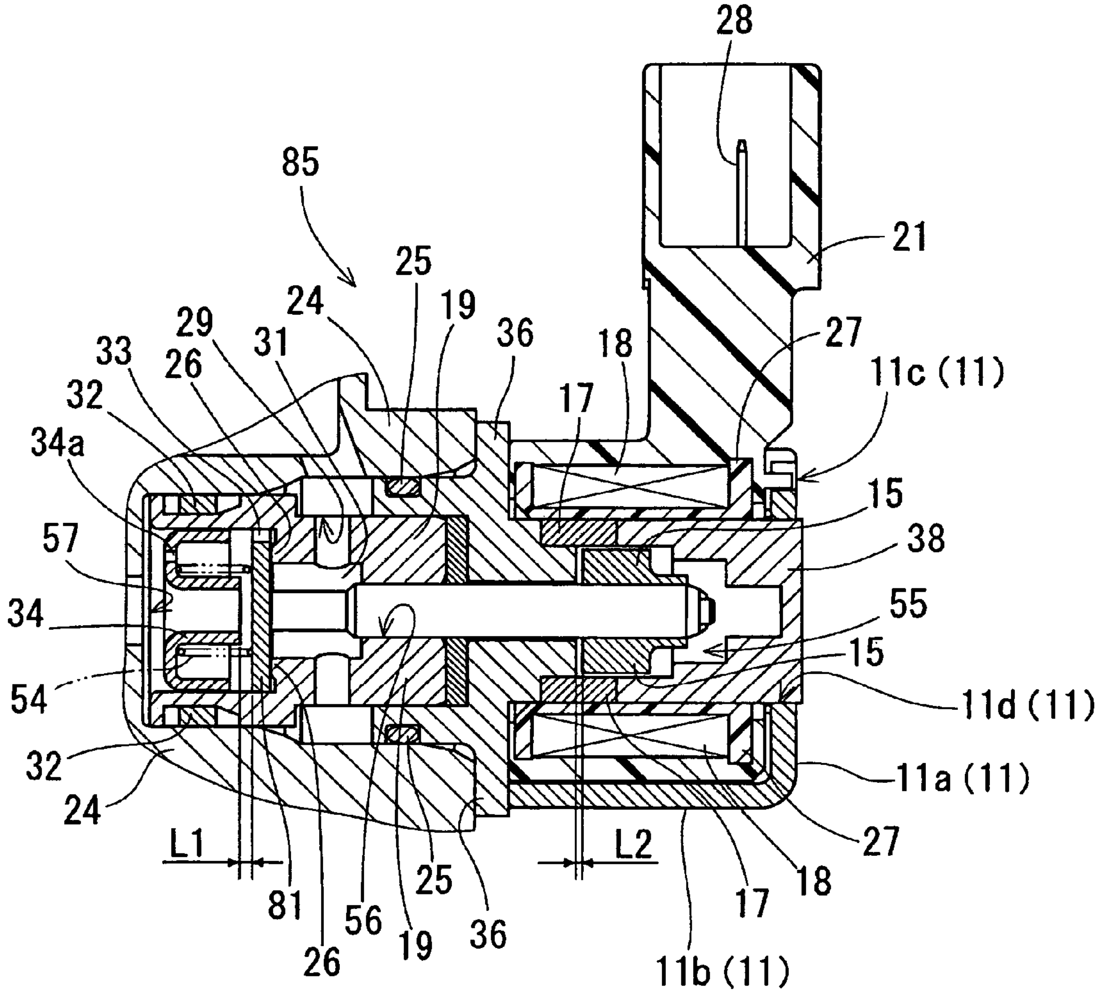
FIG. 18 is a sectional view of a solenoid valve according to an eighth embodiment of the present invention.

FIG. 18 is a sectional view of a solenoid valve according to the eighth embodiment of the present invention. A valve member 81 according to the eighth embodiment corresponds to the valve member 53 that is connected with the needle 39 in the fifth embodiment. According to the solenoid valve 85, when the valve member 81 is displaced in the valve opening direction by the differential pressure, the mobile core 15 is displaced toward the stationary core 36. It is to be noted that a response speed of the valve member 81 may be inferior to that of the needle 39 in the fifth embodiment due to an increased inertial mass, because the valve member 81 is made of the valve member 53 that is connected with the needle 39 in the fifth embodiment. However, the solenoid valve 85 does not require the coil spring 13 serving as the second bias member. Thus, when the response speed stays within an allowable range, a structure according to the eighth embodiment may be used to reduce cost.

Except for the above-described points, the solenoid valve 85 according to the eighth embodiment is substantially identical to the solenoid valve 37 according to the fifth embodiment.

The fifth to seventh embodiments describe cases that the F1 is greater than the F2. However, the F1 may be equal to the F2. When the F1 is equal to the F2, the valve member 53 may be displaced to be seated on the valve seat by a flow of the fuel, which is returned from the pump chamber 45 to the fuel chamber 41. However, it may take more time for the valve member 53 to be displaced to be seated than the case where the coil spring 54 pushes the valve member 53.

In the above-described solenoid valve according to the fifth to seventh embodiments of the present invention, the coil spring serving as the second bias member pushes the needle in the valve opening direction in the first part of the intake stroke. Thus, the length of the air gap between the mobile core 15 and the stationary core 36 is already set at almost zero at the time for the driving circuit to start energizing the coil 18 in the latter part of the intake stroke. Accordingly, the distance that the mobile core 15 is displaced after the energization of the coil 18 is almost zero. Thus, time, which it takes for the mobile core 15 to be displaced to contact the stationary core 36, can be shortened. Namely, the response speed of the needle is improved. Also, when an object is closer, the less current needs to be applied in order to provide the object with a specific amount of the magnetic force. Thus, when the length of the air gap is reduced before the driving circuit starts the energization of the coil 18, a necessary magnetic force for attraction is achieved with a lower current. Accordingly, a sufficient response speed is achieved by a driving circuit that is slow to build up a current, such as a voltage drive circuit. Therefore, the solenoid valve according to the fifth to seventh embodiments achieves the sufficient response speed without increasing the cost of the driving circuit.

Also, in the solenoid valve 85 according to the eighth embodiment of the present invention, when the valve member 81 is detached from the valve seat in the first part of the intake stroke, the mobile core 15 is displaced toward the stationary core 36. Thus, the length of the air gap between the mobile core 15 and the stationary core 36 is already set at almost zero when the driving circuit starts the energization of the coil 18 in the latter part of the intake stroke. Accordingly, the distance that the mobile core 15 is displaced after the coil 18 is energized is almost zero, and time, which it takes for the mobile core 15 to be displaced to contact the stationary core 36, can be shortened. Namely, the response speed of the valve member 81 is improved. Also, when an object is closer, the less current needs to be applied in order to provide the object with a specific amount of the magnetic force. Thus, when the length of the air gap is reduced before the driving circuit starts energizing the coil 18, a necessary magnetic force for attraction is achieved with a lower current. Accordingly, a sufficient response speed is achieved by a driving circuit that is slow to build up a current, such as a voltage drive circuit. Therefore, the solenoid valve according to the eighth embodiment achieves the sufficient response speed without increasing the cost of the driving circuit.

It is noted that when an object is closer and the same amount of current is applied, the less winding number of the coil 18 is needed in order to provide the object with a specific amount of the magnetic force. Thus, when the length of the air gap is reduced before the driving circuit starts energizing the coil 18, a sufficient magnetic force for attraction is achieved with the less winding number. Accordingly, when downsizing of the driving circuit has more priority than cost reduction of the driving circuit, the coil may be minimized by reducing the winding number. In this case, the sufficient response speed is also achieved.

In the high-pressure fuel pump 58 according to the embodiment of the present invention, a driving current, which drives, for instance, the solenoid valve 37 for opening and closing the fuel passage 44, can be reduced. Accordingly, cost of the driving circuit is limited from increasing. Also, the solenoid valve 37 and the high-pressure fuel pump 58 can be minimized when the same amount of the current is applied instead of reducing the current. Also, the solenoid valve 37 is quickly held at a valve opening position by energization of the solenoid valve 37 regardless of the differential pressure between the fuel inlet port 42*a* and the pump chamber 45. Therefore, the solenoid valve 37 can follow the speed of the reciprocal displacement of the plunger 48, even when the cam rotates at high speed to drive the plunger 48 in such a manner that the speed of the reciprocal displacement of the plunger 48 increases. Accordingly, the connection between the fuel inlet port 42*a* and the pump chamber 45 can be opened and closed at desired timing.

Combinations of the members and parts of the present invention are not limited to combinations described in the embodiments of the specification and the drawings. Any members and parts of any embodiments can be combined.

Additional advantages and modifications will readily occur to those skilled in the art. The invention in its broader terms is therefore not limited to the specific details, representative apparatus, and illustrative examples shown and described.

What is claimed is:

1. A flow-metering valve for metering a flow of liquid, comprising:

a liquid inlet port, through which the liquid is supplied to the flow-metering valve;

a liquid outlet port, through which the liquid outflows from the flow-metering valve;

a liquid chamber that is formed between the liquid inlet port and the liquid outlet port;

a valve member, which is arranged in the liquid chamber, wherein:

the valve member is reciprocally displaceable between a first position and a second position in the liquid chamber according to a differential pressure between a first position side of the valve member and a second position side of the valve member;

the valve member enables communication between the liquid inlet port and the liquid outlet port when the valve member is spaced away from the first position; and the valve member is made of a magnetic material, a stopper that is arranged at the second position in the liquid chamber, wherein:

the stopper is made of a magnetic material; and the stopper contacts the valve member when the valve member is located at the second position, which serves as a valve opening position; and an electromagnetic driving member that generates a magnetic attractive force between the valve member and the stopper to hold the valve member at the second position when the electromagnetic driving member is energized, wherein:

the electromagnetic driving member is provided at a location radially outward of the stopper; and the electromagnetic driving member forms a magnetic field when the electromagnetic driving member is energized such that the electromagnetic driving member generates the magnetic attractive force between the valve member and the stopper to directly magnetically attract the stopper to the valve member.

2. A fuel injection pump comprising:

the flow-metering valve according to claim 1; and a plunger that is reciprocably displaceable to compress fuel, which is supplied into the liquid chamber through the liquid inlet port, and pumps the fuel through the liquid outlet port, wherein:

the liquid inlet port, the liquid outlet port and the valve member are arranged on a first side of the stopper; and the plunger is arranged on a second side of the stopper, which is opposite from the first side of the stopper.

3. The fuel injection pump according to claim 2, wherein the stopper includes at least one communication passage, which penetrates through the stopper to provide communication between the first side and the second side of the stopper in the liquid chamber.

4. The fuel injection pump according to claim 3, wherein the at least one communication passage is located radially outward of a contact part between the valve member and the stopper when the valve member is held in the second position.

5. The fuel injection pump according to claim 2, wherein the flow-metering valve includes at least one communication passage that communicates the first side of the stopper and the second side of the stopper in the liquid chamber.

6. A solenoid valve, comprising:

a liquid inlet port, through which liquid is supplied to the solenoid valve;

a liquid outlet port, through which the liquid outflows from the solenoid valve;

a liquid passage that is arranged between the liquid inlet port and the liquid outlet port;

a valve member that opens and closes the liquid passage, the valve member being displaceable by a pressure difference between a first side and a second side of the valve member, the first side being communicated with the liquid inlet port, the second side being communicated with the liquid outlet port;

a first bias member that provides a bias force directly to the valve member to bias the valve member in a first direction such that the valve member closes the liquid passage;

a needle that is displaceable independently of the valve member, wherein the needle contacts the valve member to limit displacement of the valve member in the first direction;

an electromagnetic driving member that includes:

a mobile core that is displaceable along with the needle;

a stationary core that is arranged to face with the mobile core; and a coil that generates a magnetic attractive force to attract the mobile core to the stationary core such that the needle is displaced in a second direction toward the valve member; and a second bias member that provides a bias force directly to the needle to bias the needle in the second direction, wherein the bias force of the first bias member is greater than the bias force of the second bias member, wherein:

the first bias member displaces the valve member and the needle in the first direction when the electromagnetic driving member is not energized.

7. The solenoid valve according to claim 6, wherein the mobile core contacts the stationary core when the coil generates the magnetic attractive force.

* * * * *